US010649114B2

United States Patent
Lee et al.

(10) Patent No.: US 10,649,114 B2
(45) Date of Patent: May 12, 2020

(54) BACKLIGHT UNIT WITH OPTICAL MEMBER AND PROTECTIVE MEMBER AND DISPLAY DEVICE INCLUDING THE SAME

(71) Applicant: Samsung Display Co., Ltd., Yongin-Si (KR)

(72) Inventors: Baekhee Lee, Seoul (KR); Jangsoo Kim, Asan-si (KR); Hyuk-hwan Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/296,236

(22) Filed: Mar. 8, 2019

(65) Prior Publication Data

US 2019/0293839 A1 Sep. 26, 2019

(30) Foreign Application Priority Data

Mar. 21, 2018 (KR) ........................ 10-2018-0032899

(51) Int. Cl.
*G02B 1/14* (2015.01)
*F21V 8/00* (2006.01)

(52) U.S. Cl.
CPC .............. *G02B 1/14* (2015.01); *G02B 6/005* (2013.01); *G02B 6/0051* (2013.01); *G02B 6/0055* (2013.01)

(58) Field of Classification Search
CPC .... G02B 6/005; G02B 6/0051; G02B 6/0055; G02B 6/0045; G02B 1/14
See application file for complete search history.

(56) References Cited

U.S. PATENT DOCUMENTS

| 5,949,933 | A  | * | 9/1999  | Steiner .................... F21V 5/02 |
|           |    |   |         | 362/551 |
| 8,727,597 | B2 | * | 5/2014  | Meir .................... G02B 6/0021 |
|           |    |   |         | 362/612 |
| 9,632,350 | B2 |   | 4/2017  | Nam et al. |
| 9,857,522 | B2 | * | 1/2018  | Lin ........................ G02B 6/005 |
| 10,018,861 | B2 |   | 7/2018  | Kim et al. |
| 2010/0283072 | A1 | * | 11/2010 | Kazlas .................. G02B 6/005 |
|           |    |   |         | 257/98 |

(Continued)

FOREIGN PATENT DOCUMENTS

| JP | 2016181474 A | * | 10/2016 |
| JP | 2016-194996 |   | 11/2016 |

(Continued)

*Primary Examiner* — Robert J May
(74) *Attorney, Agent, or Firm* — H.C. Park & Associates, PLC

(57) ABSTRACT

A display device includes a display panel, a light source unit, a light guide plate including a light exit surface, a bottom surface, a light incident surface, an opposite surface, and first and second side surfaces connecting the light incident surface and the opposite surface and being opposite to each other, a first refractive layer disposed on the light exit surface and having a refractive index lower than that of the light guide plate, an optical member between the display panel and the light guide plate, and an protective member covering at least one of a side surface of the optical member and at least a portion of a side surface of the light guide plate corresponding thereto.

20 Claims, 18 Drawing Sheets

(56) References Cited

U.S. PATENT DOCUMENTS

2018/0364408 A1* 12/2018 Hwang ............. G02F 1/133524
2019/0154901 A1    5/2019 Lee et al.

FOREIGN PATENT DOCUMENTS

| KR | 10-2014-0058991 | 5/2014 |
| KR | 10-2015-0114113 | 10/2015 |
| KR | 10-2016-0000915 | 1/2016 |
| KR | 10-2016-0108212 | 9/2016 |
| KR | 10-2017-0125189 | 11/2017 |
| KR | 10-2019-0058743 | 5/2019 |

* cited by examiner

BACKLIGHT UNIT WITH OPTICAL MEMBER AND PROTECTIVE MEMBER AND DISPLAY DEVICE INCLUDING THE SAME

CROSS-REFERENCE TO RELATED APPLICATION

This application claims priority from and the benefit of Korean Patent Application No. 10-2018-0032899, filed on Mar. 21, 2018, which is hereby incorporated by reference for all purposes as if fully set forth herein.

BACKGROUND

Field

Exemplary implementations of the invention relate generally to a display panel, and, more specifically, to a backlight unit and a display device including the same for preventing light from being leaked through a light guide plate and for preventing moisture and/or oxygen from permeating to the backlight unit.

Discussion of the Background

Generally, a display device includes a display panel displaying an image by using light and a backlight unit disposed at the rear of the display panel to provide the light to the display panel. The backlight unit may include a light source for generating light and a light guide plate for guiding the light to the display panel. The light source may be disposed adjacent to one side surface of the light guide plate to provide the light to a light incident portion defined as the one side surface of the light guide plate.

The light provided in the light guide plate may be totally reflected by a top surface of the light guide plate and thus may travel to an opposite portion of the light guide plate, which is opposite to the light incident portion. The totally reflected light may be diffused by diffusion patterns disposed at a bottom surface of the light guide plate. However, the light may not be totally reflected at the top surface of the light guide plate adjacent to the light incident portion but may be leaked through the top surface of the light guide plate, and thus light efficiency may be reduced.

The above information disclosed in this Background section is only for understanding of the background of the inventive concepts, and, therefore, it may contain information that does not constitute prior art.

SUMMARY

Backlight units and display devices including the same constructed according to the principles and exemplary implementations of the invention are capable of reducing or preventing light from being leaked through a light guide plate adjacent to a light incident surface and of preventing moisture and/or oxygen from permeating to the backlight unit. For example, according to the principles and various disclosed implementations a protective member, which is may be formed as an adhesive member, having reflective properties covers at least one of the surfaces of the backlight unit.

Additional features of the inventive concepts will be set forth in the description which follows, and in part will be apparent from the description, or may be learned by practice of the inventive concepts.

According to one aspect of the invention, a display device includes a display panel to display an image, a light source unit adjacent to the display panel to provide light thereto, a light guide plate including a light exit surface facing the display panel, a bottom surface opposite to the light exit surface, a light incident surface facing the light source unit and connecting the bottom surface and the light exit surface, an opposite surface opposite to the light incident surface, and a first side surface and a second side surface which connect the light incident surface and the opposite surface and are opposite to each other, a first refractive layer disposed on the light exit surface and having a refractive index lower than that of the light guide plate, an optical member disposed between the display panel and the light guide plate and including a top surface facing the display panel, a bottom surface opposite to the top surface, a first connection surface connecting the top surface and the bottom surface and disposed at the same side as the light incident surface, a second connection surface opposite to the first connection surface, and a third connection surface and a fourth connection surface which connect the first and second connection surfaces and are opposite to each other, a first protective member covering at least a portion of at least one of the light exit surface of the light guide plate and the first connection surface of the optical member, and a second protective member covering at least one of the opposite surface and the second connection surface.

The optical member may include a first inorganic layer disposed on the first refractive layer and having a refractive index higher than that of the first refractive layer, a second inorganic layer having a refractive index lower than that of the first inorganic layer, a light conversion layer disposed between the first inorganic layer and the second inorganic layer, and an organic layer disposed on the second inorganic layer. The light conversion layer exposed by the second inorganic layer and may be in contact with the first protective member and the second protective member.

Each of the first and second protective members may further include a sub-protective member covering at least a portion of a top surface of the second inorganic layer.

The first and second protective members may expose some of side surfaces of the light conversion layer, and at least one of the second inorganic layer or the organic layer may cover the some side surfaces of the light conversion layer, which are exposed by the first and second protective members.

The light conversion layer may include quantum dots.

The first and second protective members may include at least one of silver (Ag), aluminum (Al), or titanium dioxide ($TiO_2$).

The first and second protective members may include adhesive members selected from the group consisting of adhesive layers, pastes and tapes.

The light may be blue light.

The display device may further include a member having a diffusion pattern disposed on the bottom surface of the light guide plate, and a reflective sheet disposed under the diffusion pattern. The second protective member may further cover a portion of the diffusion pattern.

The display device may further include an optical sheet member disposed between the display panel and the optical member and including at least one of a diffusion sheet, a prism sheet disposed on the diffusion sheet, or a brightness enhancement sheet disposed on the prism sheet.

The display device may further include third and fourth members respectively covering the third and fourth connection surfaces exposed by the first and second protective members.

The light exit surface may further include a first inclined surface inclined from the light incident surface at a predetermined angle and connected to the light incident surface, and the bottom surface of the light guide plate may further include a second inclined surface inclined from the light incident surface at a predetermined angle and connected to the light incident surface. The first inclined surface may be covered by the first protective member.

According to another aspect of the invention, a backlight unit includes a light source unit to provide light, a light guide plate including a light exit surface from which the light exits, a bottom surface opposite to the light exit surface, a light incident surface facing the light source unit and connecting the bottom surface and the light exit surface, an opposite surface opposite to the light incident surface, and a first side surface and a second side surface which connect the light incident surface and the opposite surface and are opposite to each other, a first refractive layer disposed on the light exit surface and having a refractive index lower than that of the light guide plate, an optical member including a light conversion layer having quantum dots, a first inorganic layer disposed on a bottom surface of the light conversion layer, and a second inorganic layer disposed on a top surface of the light conversion layer and exposing at least one side surface of the light conversion layer, and a protective member covering and being in contact with the exposed at least one side surface of the light conversion layer.

The optical member may further include an organic layer disposed on the second inorganic layer. The optical member may include a top surface which is substantially the same as a top of the organic layer, a bottom surface which is opposite to the top surface and is substantially the same as a bottom of the first inorganic layer, and a plurality of connection surfaces connecting the top surface and the bottom surface. At least one of the connection surfaces, which is exposed from the first and second inorganic layers, is covered by the protective member and may be in direct contact with the protective member.

The protective member may further include a sub-protective member covering at least a portion of a top surface of the organic layer.

The protective member may further include a sub-protective member covering the opposite surface.

The light exit surface may further include a first inclined surface having a predetermined angle from the light incident surface and connected to the light incident surface, and the bottom surface of the light guide plate may further include a second inclined surface having a predetermined angle from the light incident surface and connected to the light incident surface. At least a portion of the first inclined surface may be covered by the protective member.

One of the connection surfaces covered by the protective member of the optical member may be adjacent to the opposite surface and may be substantially coplanar with the opposite surface.

The protective member may include at least one of silver (Ag), aluminum (Al), or titanium dioxide ($TiO_2$).

The light may be blue light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
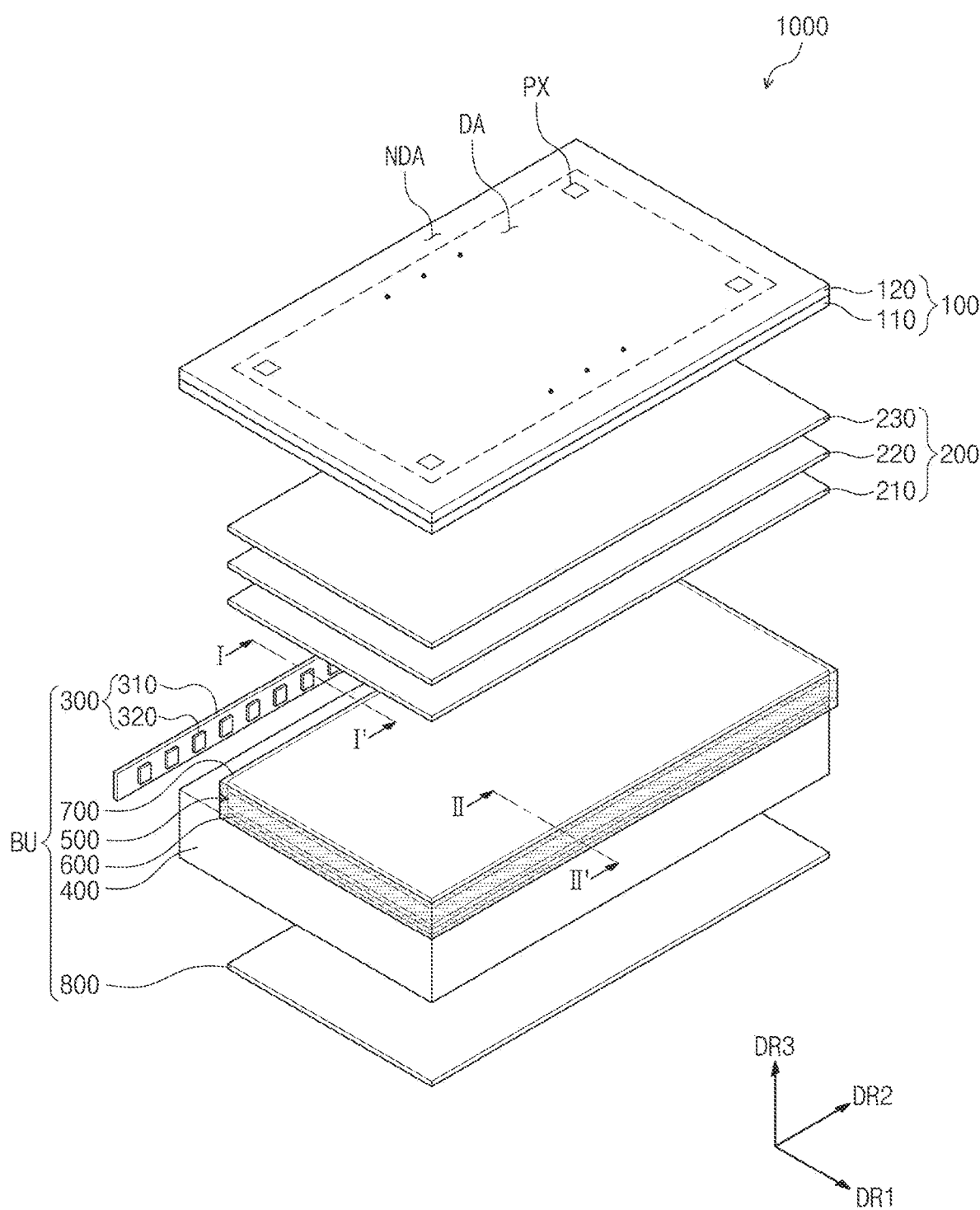
FIG. 1 is an exploded perspective view of an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
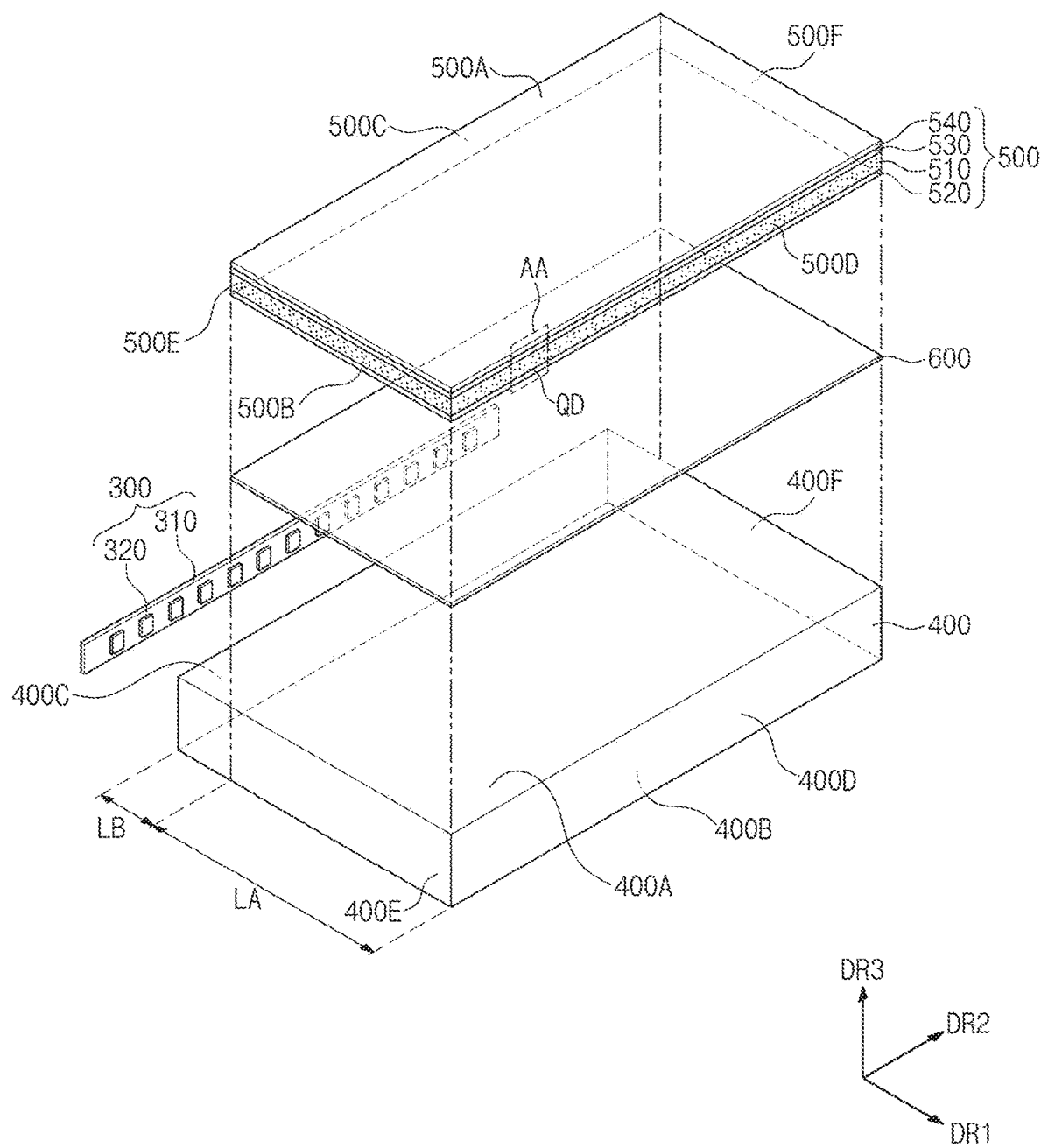
FIG. 2 is an exploded perspective view of some components of a backlight unit of FIG. 1.
Figure 3A:
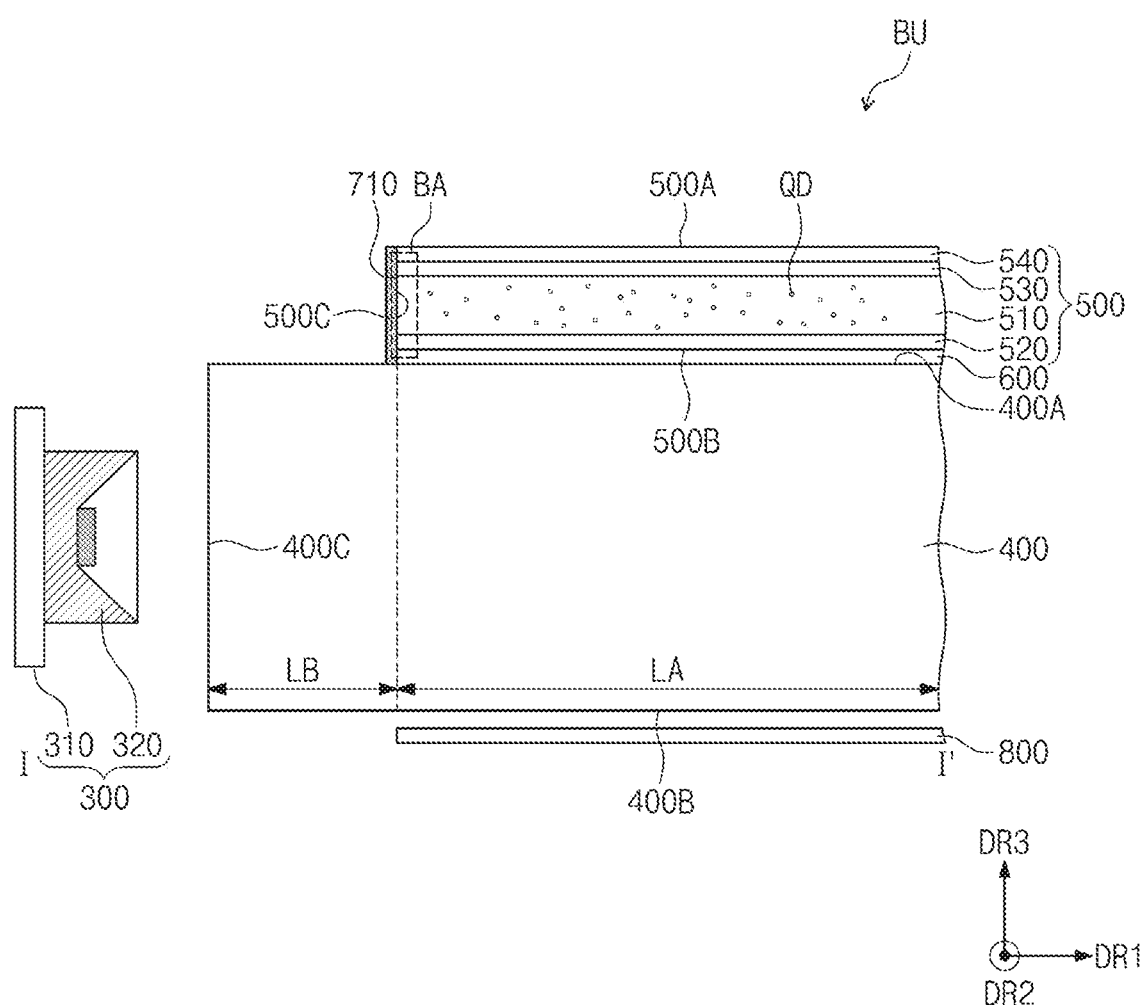
FIG. 3A is a cross-sectional view taken along a line I-I' of FIG. 1 to illustrate details of the backlight unit of FIG. 1.
Figure 3B:
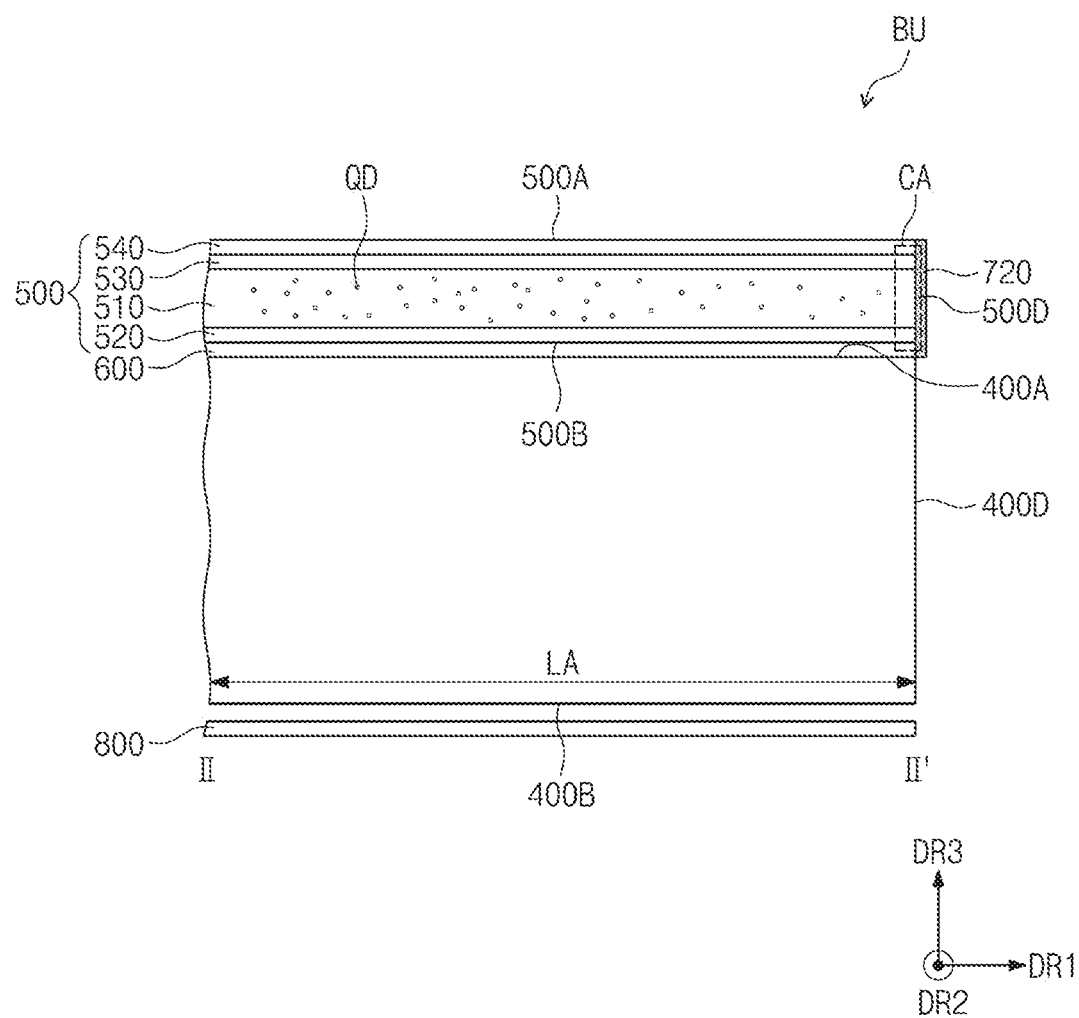
FIG. 3B is a cross-sectional view taken along a line II-II' of FIG. 1 to illustrate details of the backlight unit of FIG. 1.

FIG. 1 is an exploded perspective view of an exemplary embodiment of a display device constructed according to principles of the invention. FIG. 2 is an exploded perspective view of some components of FIG. 1. FIGS. 3A and 3B are cross-sectional views illustrating details of the backlight unit according to an exemplary embodiment of the invention. Hereinafter, a display device according to an exemplary embodiment will be described with reference to FIGS. 1, 2, 3A and 3B.

Referring to FIGS. 1 and 2, a display device 1000 according to an exemplary embodiment may include a display panel 100 configured to display an image using light, an optical sheet member 200, and a backlight unit BU configured to generate light and to provide the light to the display panel 100.

The display panel 100 may include pixels PX for displaying an image. The pixels PX may be arranged in a matrix form. The display panel 100 may include a display area DA in which the pixels PX are disposed, and a non-display area NDA adjacent to the display area DA. The display panel 100 may include at least one of various kinds of display panels according to various embodiments. In an embodiment, the display panel 100 may be a liquid crystal display panel. In detail, the display panel 100 may include a first substrate 110, a second substrate 120 facing the first substrate 110, and a liquid crystal layer disposed between the first substrate 110 and the second substrate 120. However, exemplary embodiments are not limited thereto. In other embodiments, the display panel 100 may be an electrophoretic display panel or an electrowetting display panel, which displays an image using light.

The optical sheet member 200 may include a diffusion sheet 210, a prism sheet 220, and a brightness enhancement sheet 230. The optical sheet member 200 may be disposed on an optical member 500. The optical sheet member 200 may diffuse and concentrate light provided from a light guide plate 400.

The diffusion sheet 210 of the sheets of the optical sheet member 200 may be closest to the optical member 500. The diffusion sheet 210 may disperse or diffuse light provided from the light guide plate 400 to prevent light from being partially concentrated. For example, the diffusion sheet 210 may include at least one of polyester or polycarbonate. The prism sheet 220 may change side light of light transmitted through the diffusion sheet 210 into front light and may concentrate radiating light to increase brightness. The brightness enhancement sheet 230 (e.g., a dual brightness enhancement film) may reduce a loss of light exiting from the prism sheet 220.

The backlight unit BU may be disposed at the rear of the display panel 100 to provide light to the display panel 100. The backlight unit BU according to an exemplary embodiment may include a light source unit 300, the light guide plate 400, the optical member 500, a low refractive layer 600, a protective member which may take the form of an adhesive member 700, and a reflective sheet 800.

The light source unit 300 may include a circuit board 310 and a light source 320. The circuit board 310 may be electrically connected to the light source 320 to control light emitted from the light source 320. As illustrated in FIG. 1, the light source 320 may be provided in plurality on the circuit board 310. The light source unit 300 according to the inventive concepts may be an edge type disposed adjacent to a side surface of the light guide plate 400. Even though not shown in the drawings, the circuit board 310 may include a plurality of circuit boards corresponding to a plurality of the light sources, respectively. Even though not shown in the drawings, the circuit board 310 may include a substrate and a circuit layer. The circuit layer may be electrically connected to the light source 320. In more detail, the circuit layer may be connected to electrodes of the light source 320. The circuit layer may include conductive lines or conductive pads which are connected to the electrodes, respectively. The circuit layer may include a metal material, for example, copper (Cu).

The light source 320 may be electrically connected to the circuit layer. The light source 320 may include a light emitting diode (LED) which emits light in response to an electrical signal received from the circuit layer. The light emitting diode may have a structure in which a first electrode, an N-type semiconductor layer, an active layer, P-type semiconductor layer, and a second electrode are sequentially stacked. The first electrode may be electrically connected to the circuit layer, and the second electrode may face the first electrode and may be electrically connected to the circuit layer. When a driving voltage is applied to the light emitting diode, electrons and holes may move and may be recombined with each other, and thus light may be emitted by the recombination of the electrons and holes. In an exemplary embodiment, the light source 320 may include a plurality of the light emitting diodes, and lights generated from the light emitting diodes may have the same color or different colors. According to an embodiment, the light source 320 may generate blue light.

The light guide plate 400 may be disposed under the display panel 100. The light guide plate 400 may include a material that has a high light transmittance in a visible light band. In an embodiment, the light guide plate 400 may include an optically transparent material. For example, the light guide plate 400 may include a glass substrate, a plastic substrate, or a combination thereof. Hereinafter, the light guide plate 400 formed of glass will be described as an example.

The light guide plate 400 may include a light exit surface 400A, a bottom surface 400B, and a plurality of side surfaces 400C, 400D, 400E and 400F. The light guide plate 400 may guide light received from the light source unit 300 to the display panel 100. In the exemplary embodiment, the light guide plate 400 may have a rectangular plate shape.

The light exit surface 400A may be defined as a surface facing the display panel 100. The bottom surface 400B may be opposite to the light exit surface 400A. The plurality of side surfaces 400C, 400D, 400E and 400F may include first and second side surfaces 400C and 400D facing each other in a first direction DR1, and third and fourth side surfaces 400E and 400F facing each other in a second direction DR2 and connected to the first and second side surfaces 400C and 400D.

According to an exemplary embodiment, a light incident surface is defined at at least one of the side surfaces 400C, 400D, 400E and 400F. The light incident surface may face the light source 320 and may receive light provided from the light source 320. FIG. 2 illustrates an embodiment in which the light incident surface is defined at the first side surface 400C. The light guide plate 400 may guide light incident on the light incident surface 400C and may provide the light to the display panel 100 through the light exit surface 400A. However, exemplary embodiments are not limited thereto. In other embodiments, the light incident surface may be defined at one of the second to fourth side surfaces 400D, 400E and 400F or may be defined at two or more of the first to fourth side surfaces 400C, 400D, 400E and 400F.

The light exit surface 400A of the light guide plate 400 according to the exemplary embodiment may include a first area LA and a second area LB. The first area LA and the second area LB may be arranged in the first direction DR1. The first area LA and the second area LB may be connected to each other. The second area LB may be closer to the light incident surface 400C than the first area LA. Thus, the first area LA may be closer to the second side surface (e.g., an opposite surface) 400D than the second area LB.

The optical member 500 may include a light conversion layer 510, a first inorganic layer 520, a second inorganic layer 530, and an organic layer 540. The optical member 500 may be disposed between the display panel 100 and the light guide plate 400. As illustrated in FIG. 3A, the optical member 500 may overlap with the first area LA of the light exit surface 400A in a plan view and may expose the second area LB of the light exit surface 400A. However, exemplary embodiments are not limited thereto. In another embodiment, the optical member 500 may cover both the first area LA and the second area LB.

The light conversion layer 510 may include a plurality of conversion particles for converting light provided from the light guide plate 400. Each of the conversion particles may absorb at least a portion of light and may emit light of a specific color or transmit the light without converting the light. When light incident to the light conversion layer 510 has sufficient energy to excite the conversion particle, the conversion particle may absorb at least a portion of the incident light so as to be in an excited state and then may emit light of a specific color while being stabilized. On the contrary, when the incident light has insufficient energy to excite the conversion particle, the incident light may pass through the light conversion layer 510 without being converted and then may be visible to the outside.

In an embodiment, a color of light emitted or radiated from the conversion particle may be determined depending on a particle size of the conversion particle. For example, a wavelength of the emitted light may increase as the particle size increases. On the contrary, the wavelength of the emitted light may decrease as the particle size decreases. According to the exemplary embodiment, each of the conversion particles may be a quantum dot QD. The light emitted from the conversion particles of the light conversion layer 510 may radiate in various directions. To generate white light, the light conversion layer 510 may include the quantum dots QD having different sizes on the basis of a kind of the light source 320. For example, the quantum dots QD may include a group II-VI compound, a group III-V compound, a group IV-VI compound, a group IV element, a group IV compound, or any combination thereof. The group II-VI compound may be selected from a group consisting of a binary compound selected from a group consisting of CdSe, CdTe, ZnS, ZnSe, ZnTe, ZnO, HgS, HgSe, HgTe, MgSe, MgS, and any mixture thereof; a ternary compound selected from a group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and any mixture thereof; and a quaternary compound selected from a group consisting of HgZnTeS, CdZnSeS, CdZnSeTe, CdZnSTe, CdHgSeS, CdHgSeTe, CdHgSTe, HgZnSeS, HgZnSeTe, HgZnSTe, and any mixture thereof. The group III-V compound may be selected from a group consisting of a binary compound selected from a group consisting of GaN, GaP, GaAs, GaSb, AlN, AlP, AlAs, AlSb, InN, InP, InAs, InSb, and any mixture thereof; a ternary compound selected from a group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and any mixture thereof; and a quaternary compound selected from a group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and any mixture thereof. The group IV-VI compound may be selected from a group consisting of a binary compound selected from a group consisting of SnS, SnSe, SnTe, PbS, PbSe, PbTe, and any mixture thereof; a ternary compound selected from a group consisting of SnSeS, SnSeTe, SnSTe, PbSeS, PbSeTe, PbSTe, SnPbS, SnPbSe, SnPbTe, and any mixture thereof; and a quaternary compound selected from a group consisting of SnPbSSe, SnPbSeTe, SnPbSTe, and any mixture thereof. The group IV element may be selected from a group consisting of Si, Ge, and a mixture thereof. The group IV compound may be a binary compound selected from a group consisting of SiC, SiGe, and a mixture thereof. In addition, shapes of the quantum dots QD are variously modified and are not limited to a specific shape. For example, the quantum dot QD may have a spherical shape, a pyramidal shape, a multi-arm shape, a cubic nanoparticle shape, a nanotube shape, a nanowire shape, a nanofiber shape, or a nano-plate particle shape. However, exemplary embodiments are not limited thereto. In another embodiment, the light conversion layer 510 may include a plurality of fluorescent substances. When light emitted from the light source 320 is blue light, the light conversion layer 510 may include a plurality of red fluorescent substances absorbing the blue light and emitting red light. For example, the red fluorescent substances may include at least one of (Ca, Sr, Ba)S, $(Ca, Sr, Ba)_2Si_5N_8$, $CaAlSiN_3$, $CaMoO_4$, or $Eu_2Si_5N_8$. In an embodiment, the light conversion layer 510 may include or further include green fluorescent substances absorbing the blue light exiting from the backlight unit BU and emitting green light. For example, the green fluorescent substances may include at least one of yttrium aluminum garnet (YAG), $(Ca, Sr, Ba)_2SiO_4$, $SrGa_2S_4$, BAM, $\alpha$-SiAlON, $\beta$-SiAlON, $Ca_3Sc_2Si_3O_{12}$, $Tb_3Al_5O_{12}$, $BaSiO_4$, CaAlSiON, or $(Sr_{1-x}Ba_x)Si_2O_2N_2$. In some embodiments, the quantum dots QD may absorb the blue light to convert the absorbed blue light into light in a green or red color wavelength band. In addition, a portion of the blue light may not be absorbed in the quantum dots QD. Thus, the blue light, the green light and the red light may be mixed with each other in the light conversion layer 510 to generate white light.

The first inorganic layer 520 may be disposed between the low refractive layer 600 and the light conversion layer 510. The first inorganic layer 520 may have a refractive index higher than that of the low refractive layer 600. Since the refractive index of the first inorganic layer 520 is higher than that of the low refractive layer 600, the first inorganic layer 520 may effectively transmit light provided from the light guide plate 400 to the light conversion layer 510.

The first inorganic layer 520 may include at least one of silicon oxide ($SiO_x$) or silicon nitride ($SiN_x$). The second inorganic layer 530 may be disposed on the light conversion layer 520. The first and second inorganic layers 520 and 530 may encapsulate the light conversion layer 510 to prevent oxygen and moisture from permeating to the light conversion layer 510 from the outside. The second inorganic layer 530 may have a refractive index similar to that of air. For example, the second inorganic layer 530 may have a refractive index lower than that of the first refractive layer 520. Thus, light converted by the light conversion layer 510 may be easily provided to the display panel 100. The second inorganic layer 530 may include at least one of silicon oxide ($SiO_x$) or silicon nitride ($SiN_x$). The organic layer 540 may be disposed on the second inorganic layer 530. The organic layer 540 may include at least one of polyimide (PI), polyethylene terephthalate (PET), polycarbonate (PC), epoxy, polyethylene (PE), or polyacrylate. The organic layer 540 may have a single-layered structure or a multi-layered stack structure. The organic layer 540 may be disposed on the second inorganic layer 530 to provide a planarized surface of the optical member 500.

The low refractive layer 600 may be disposed on the light guide plate 400. In more detail, the low refractive layer 600 may be disposed between the light guide plate 400 and the optical member 500. The refractive index of the low refractive layer 600 may be lower than that of the light guide plate 400. For example, the refractive index of the low refractive layer 600 may range from about 1.15 to about 1.35. The low refractive layer 600 may include an organic material and/or an inorganic material. According to the exemplary embodiments, the light guide plate 400 and the optical member 500 may have the refractive indexes higher than that of the low refractive layer 600. Side surfaces of the low refractive layer 600 may be covered by the adhesive member 700.

Light provided from the light source unit 300 may be totally reflected in the light guide plate 400 to have uniform brightness and then may be provided to the display panel 100. The total reflection may mean that total light is reflected at a boundary of a medium without being transmitted when the light is incident on the boundary of the medium at a specific incidence angle or more.

In the exemplary embodiment, the refractive index of the light guide plate 400 may be similar to that of the optical member 500. If the optical member 500 is disposed directly on the light guide plate 400, light may not be totally reflected at a boundary between the light guide plate 400 and the optical member 500 since the refractive indexes of the optical member 500 and the light guide plate 400 are similar to each other. In this case, light provided in the light guide plate 400 may not be guided in the light guide plate 400 but may exit to the outside, and thus a hot spot phenomenon that light is concentrated in a certain area may occur.

However, according to the exemplary embodiments, the low refractive layer 600 having the refractive index lower than that of the light guide plate 400 may be disposed between the light guide plate 400 and the optical member 500. Thus, a minimum angle at which light is totally reflected at a boundary of the light guide plate 400 and the low refractive layer 600 may be increased to increase efficiency of the total reflection in the light guide plate 400.

In the exemplary embodiment, the optical member 500 may include a top surface 500A, a bottom surface 500B, and connection surfaces 500C, 500D, 500E and 500F. The top surface 500A may be defined as a surface facing the display panel 100. The bottom surface 500B may be opposite to the top surface 500A. A first connection surface 500C of the connection surfaces 500C, 500D, 500E and 500F may be disposed at the same side as the light incident surface 400C. A second connection surface 500D may be opposite to the first connection surface 500C and may be coplanar with the opposite surface (i.e., the second side surface) 400D of the light guide plate 400, as illustrated in FIG. 3B. A third connection surface 500E and a fourth connection surface 500F may be connected to the first connection surface 500C and the second connection surface 500D and may be opposite to each other.

The top surface 500A may be the same as a surface (e.g., a top surface) of the organic layer 540, which faces the display panel 100. The bottom surface 500B may be the same as a surface (e.g., a bottom surface) of the first inorganic layer 520, which faces the light guide plate 400.

According to an exemplary embodiment, the adhesive member 700 may be disposed at at least one side of the optical member 500 and may be adhered to the optical member 500. The one side may correspond to one of the connection surfaces 500C, 500D, 500E and 500F.

The adhesive member 700 may cover the connection surfaces 500C, 500D, 500E and 500F and may surround the optical member 500 when viewed in a plan view. In FIGS. 3A and 3B, the adhesive member 700 adhered to the first connection surface 500C and the adhesive member 700 adhered to the second connection surface 500D are illustrated as a first sub-adhesive member 710 and a second sub-adhesive member 720, respectively, for the purpose of ease and convenience in description and illustration. However, the first and second sub-adhesive members 710 and 720 may be connected to the sub-adhesive members adhered to the third and fourth connection surfaces 500E and 500F to form the adhesive member 700 having a single unitary body. However, exemplary embodiments are not limited thereto. In another embodiment, the first and second sub-adhesive members 710 and 720 may be separated from each other and may be adhered to the first and second connection surfaces 500C and 500D independently of each other. For example, the adhesive member 700 including the first and second sub-adhesive members 710 and 720 may be implemented as a tape, paste or other adhesive member known in the art.

The adhesive member 700 may include a reflective material such as a metal (e.g., silver (Ag) or aluminum (Al)) or a metal oxide (e.g., titanium dioxide ($TiO_2$)). In addition, the adhesive member 700 may include an adhesive material including at least one of polymer resins such as polyvinyl chloride, polyethylene, polystyrene, polypropylene, and polyvinylidene chloride.

In the exemplary embodiment, the optical member 500 may be formed by a process of cutting a mother substrate in which the first inorganic layer 520, the light conversion layer 520, the second inorganic layer 530, and the organic layer 540 are stacked. A plurality of areas may be defined in the mother substrate, and one optical member 500 may be defined in each of the areas of the mother substrate. The cutting process may be performed along a scribe line between the areas of the mother substrate to divide the mother substrate into unit optical members 500. After the unit optical member 500 is separated from the mother substrate by the cutting process, the light conversion layer 510 may be exposed to the outside from the first inorganic layer 520, the second inorganic layer 530 and the organic layer 540. An exposed area AA of FIG. 2 illustrates layers exposed to the outside after the cutting process. Moisture and/or oxygen may permeate into the light conversion layer 510 exposed to the outside to cause a dark portion, and thus quality of the display device 1000 may be deteriorated.

However, according to the exemplary embodiments, the adhesive member 700 may cover the exposed connection surfaces 500C, 500D, 500E and 500F of the optical member 500. For example, exposure areas BA and CA including the first and second connection surfaces 500C and 500D may be covered by the first and second sub-adhesive members 710 and 720. Since the adhesive member 700 directly covers the exposure areas BA and CA, it is possible to prevent moisture and/or oxygen from permeating to the exposure areas BA and CA. Thus, bonding strength between the layers of the optical member 500 may be increased or improved to prevent occurrence of a defect such as interlayer delamination between the layers of the optical member 500.

The reflective sheet 800 may be disposed under the light guide plate 400. The reflective sheet 800 may reflect light exiting through the bottom surface 400B of the light guide plate 400 toward the light guide plate 400. The reflective sheet 800 may reflect the light exiting through the bottom surface 400B of the light guide plate 400 in an upward direction corresponding to a third direction DR3. The reflective sheet 800 may include a material capable of reflecting light. For example, the reflective sheet 800 may include aluminum (Al) or silver (Ag). However, exemplary embodiments are not limited thereto. In another embodiment, the reflective sheet 800 may be omitted in a display device.

Figure 4A:
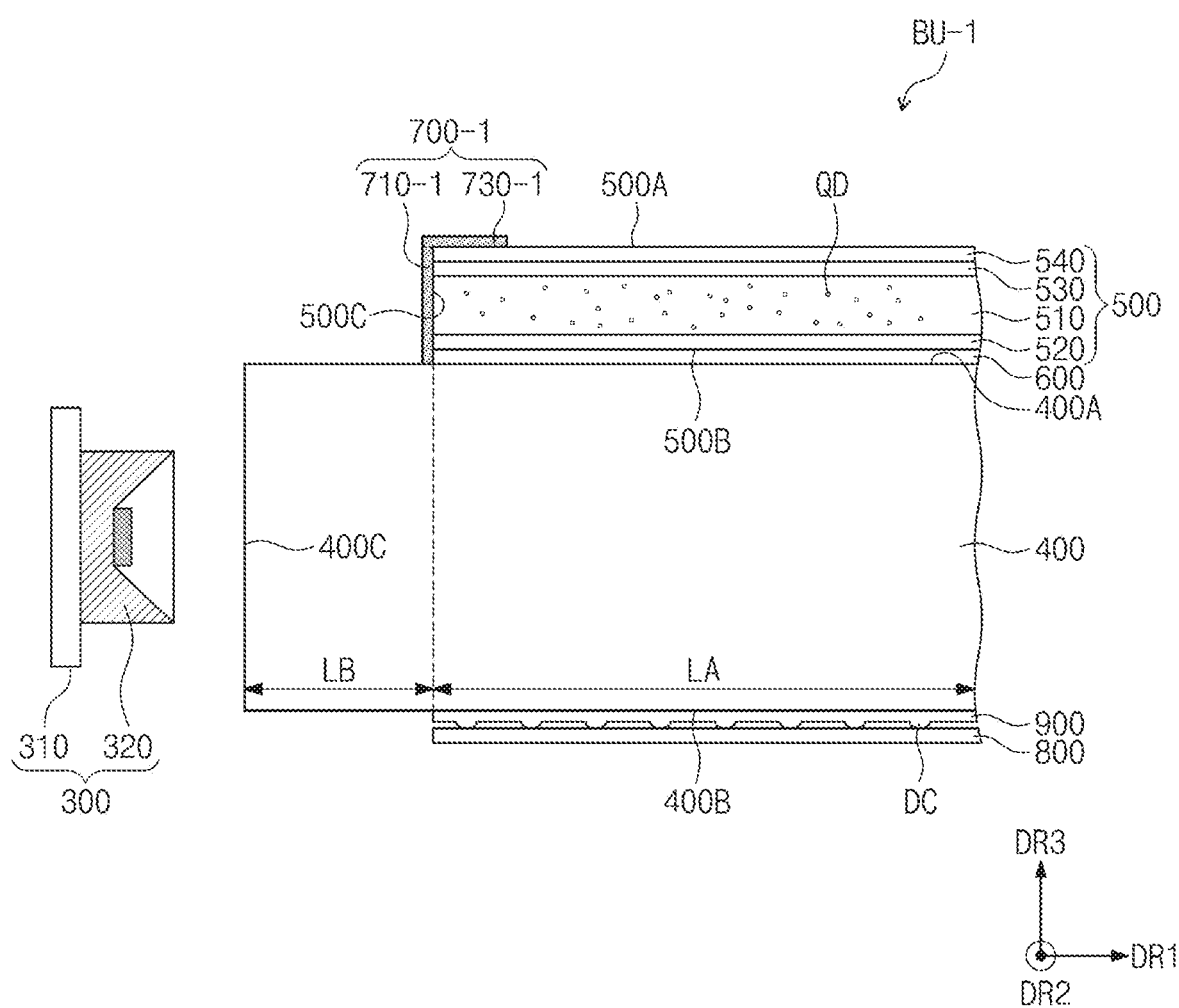
FIGS. 4A and 4B are cross-sectional views of an exemplary embodiment of a backlight unit constructed according to principles of the invention.
Figure 4B:
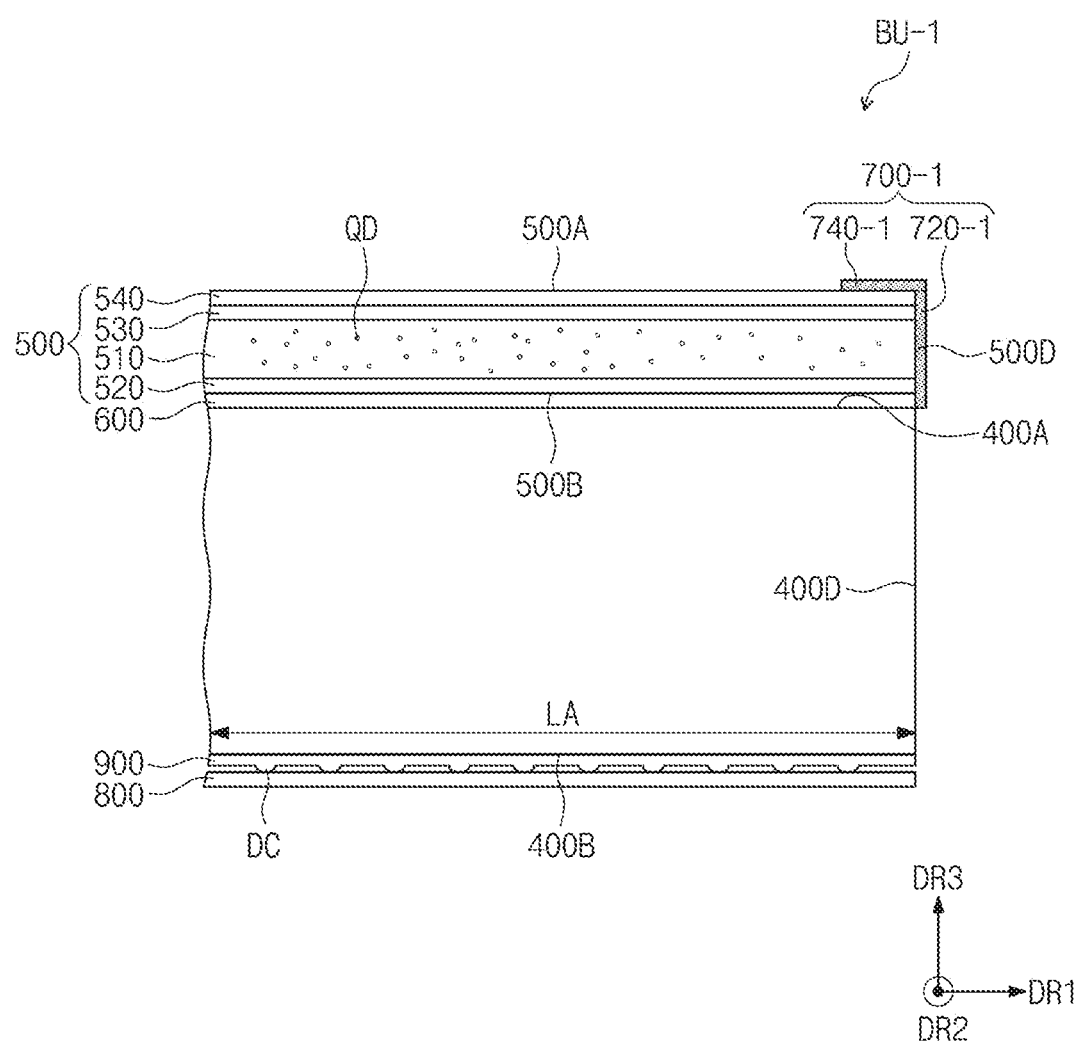

FIGS. 4A and 4B are cross-sectional views of an exemplary embodiment of a backlight unit constructed according to principles of the invention. FIG. 4A illustrates an area corresponding to that of FIG. 3A, and FIG. 4B illustrates an area corresponding to that of FIG. 3B. Hereinafter, the same components as described with reference to FIGS. 1 to 3B will be indicated by the same reference numerals or designators, and the descriptions thereto will be omitted for the purpose of ease and convenience in description.

Referring to FIGS. 4A and 4B, an adhesive member 700-1 may further cover at least a portion of the top surface 500A of the optical member 500, as compared with the embodiment of FIGS. 1 to 3B. In detail, the adhesive member 700-1 may include a first sub-adhesive member 710-1, a second sub-adhesive member 720-1, a third sub-adhesive member 730-1, and a fourth sub-adhesive member 740-1.

The first sub-adhesive member 710-1 may substantially correspond to the first sub-adhesive member 710 illustrated in FIG. 3A, and the second sub-adhesive member 720-1 may substantially correspond to the second sub-adhesive member 720 illustrated in FIG. 3B.

The third and fourth sub-adhesive members 730-1 and 740-1 may cover and be adhered to portions of the top surface 500A of the optical member 500. The third sub-adhesive member 730-1 may be connected to the first sub-adhesive member 710-1 and may cover a portion of the top surface 500A, which is adjacent to the light incident surface 400C.

The third and fourth sub-adhesive members 730-1 and 740-1 may be connected to the first and second sub-adhesive members 710-1 and 720-1 as single unitary bodies, respectively, or may be provided as independent components detachable from the first and second sub-adhesive members 710-1 and 720-1, respectively. However, the inventive concepts are not limited to one of the embodiments.

At least a portion of the adhesive member 700-1 according to the exemplary embodiment may overlap with the light guide plate 400 and the optical member 500 when viewed in a plan view. According to the exemplary embodiment, the adhesive member 700-1 may cover the exposed side surfaces of the light conversion layer 510 and the portion of the top surface 500A of the optical member 500, and thus permeation of oxygen and/or moisture may be prevented and bonding strength between components of a backlight unit BU-1 may be increased.

According to an exemplary embodiment, the backlight unit BU-1 may further include a diffusion pattern part 900. The diffusion pattern part 900 may be disposed on the bottom surface 400B of the light guide plate 400 between the light guide plate 400 and the reflective sheet 800. The diffusion pattern part 900 may overlap with the first area LA when viewed in a plan view. The diffusion pattern part 900 may include a protrusion DC protruding in the third direction DR3. The protrusion DC may be provided in plurality, and the protrusions DC may be spaced apart from each other at equal distances. In FIGS. 4A and 4B, a cross-sectional shape of the protrusion DC is illustrated as a hemispherical shape. However, exemplary embodiments are not limited thereto. In other embodiments, the cross-sectional shape of the protrusion DC may be a polygonal shape such as a triangular shape, a rectangular shape or a trapezoidal shape or may be a shape including a curved surface. The diffusion pattern part 900 may increase a total reflection rate of light, incident on the bottom surface 400B, of light provided in the light guide plate 400, and thus light may be uniformly spread in the light guide plate 400 and a portion of light may exit toward the reflective sheet 800 disposed under the light guide plate 400.

Figure 5A:
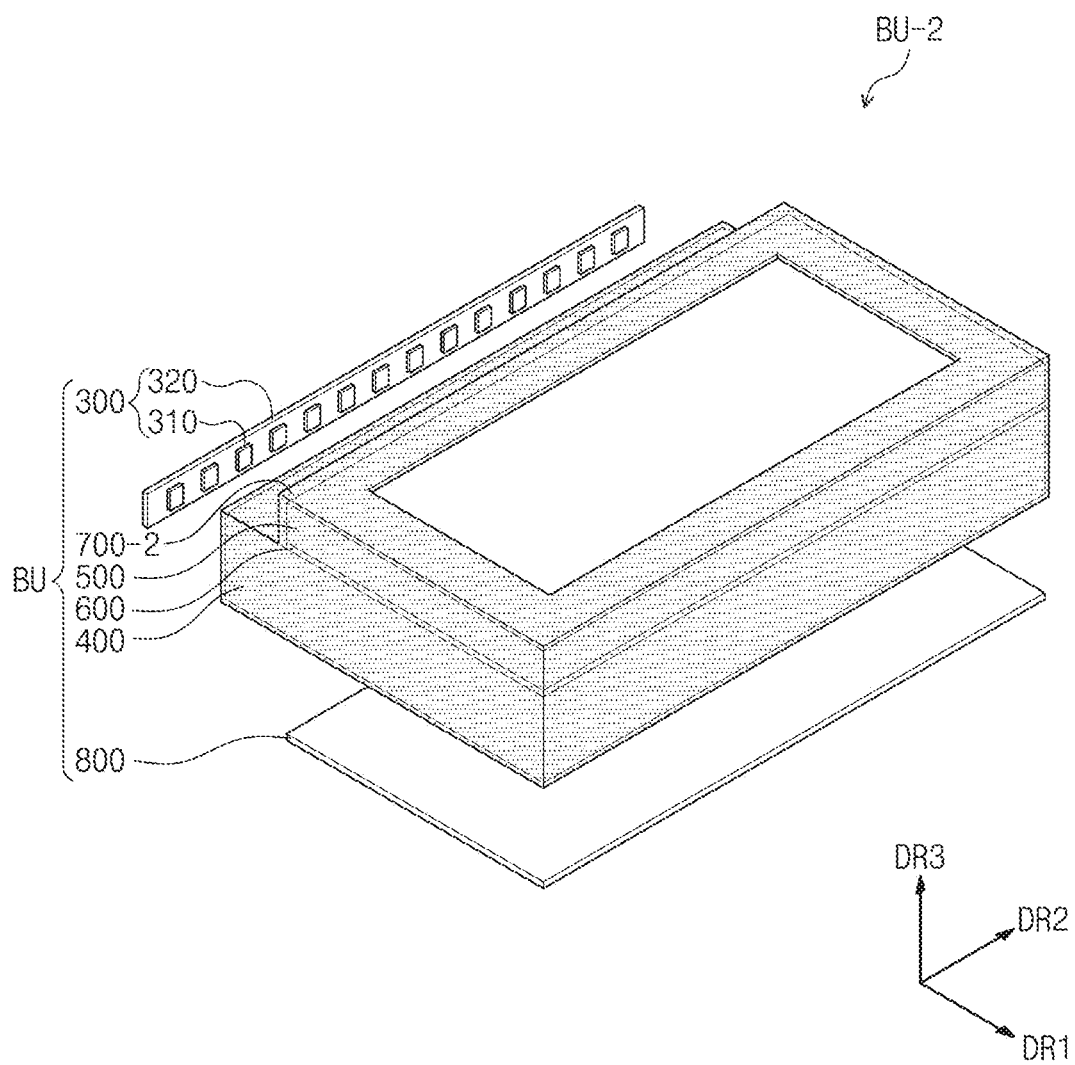
FIGS. 5A to 5E are schematic views of another exemplary embodiment of a backlight unit constructed according to principles of the invention.
Figure 5B:
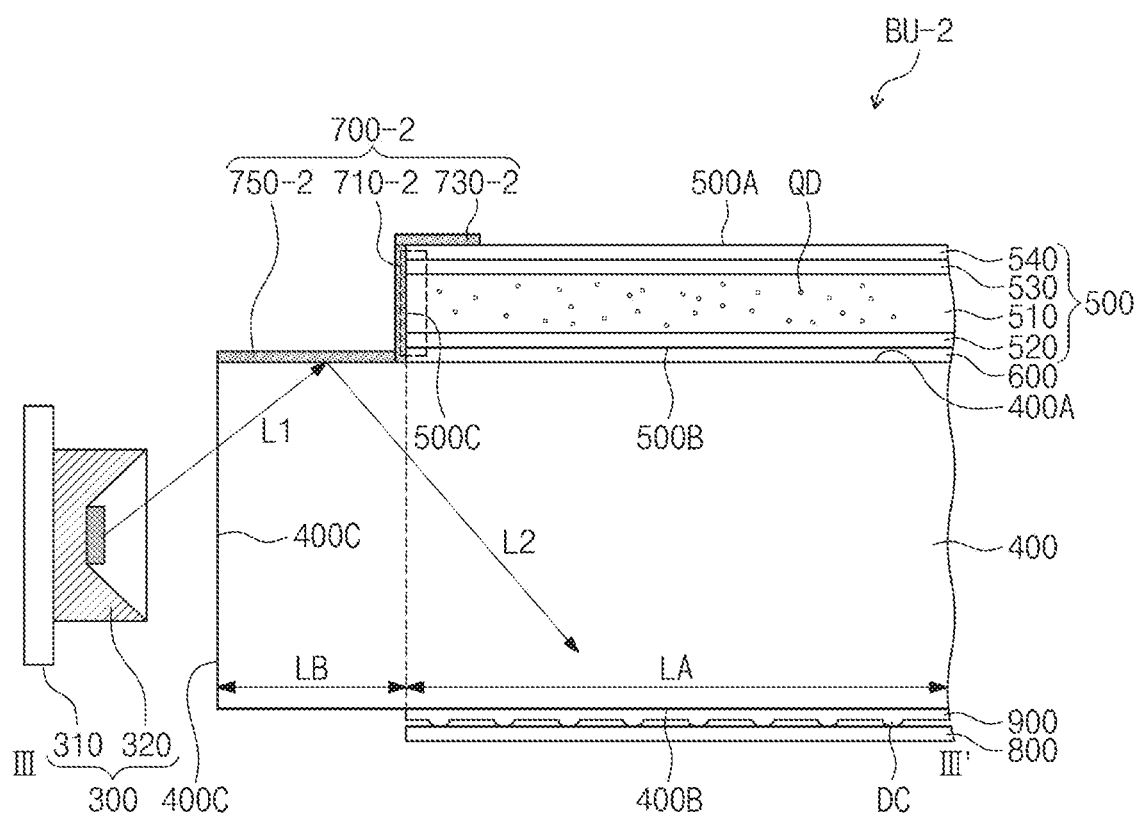

FIG. 5A is a perspective view of another exemplary embodiment of a backlight unit constructed according to principles of the invention. FIGS. 5B to 5E are cross-sectional views illustrating the backlight unit of FIG. 5A. FIG. 5B illustrates an area corresponding to that of FIG. 3A, and FIGS. 5C to 5E illustrate areas corresponding to that of FIG. 3B. Hereinafter, the same components as described with reference to FIGS. 1 to 4B will be indicated by the same reference numerals or designators, and the descriptions thereto will be omitted for the purpose of ease and convenience in description.

Figure 5C:
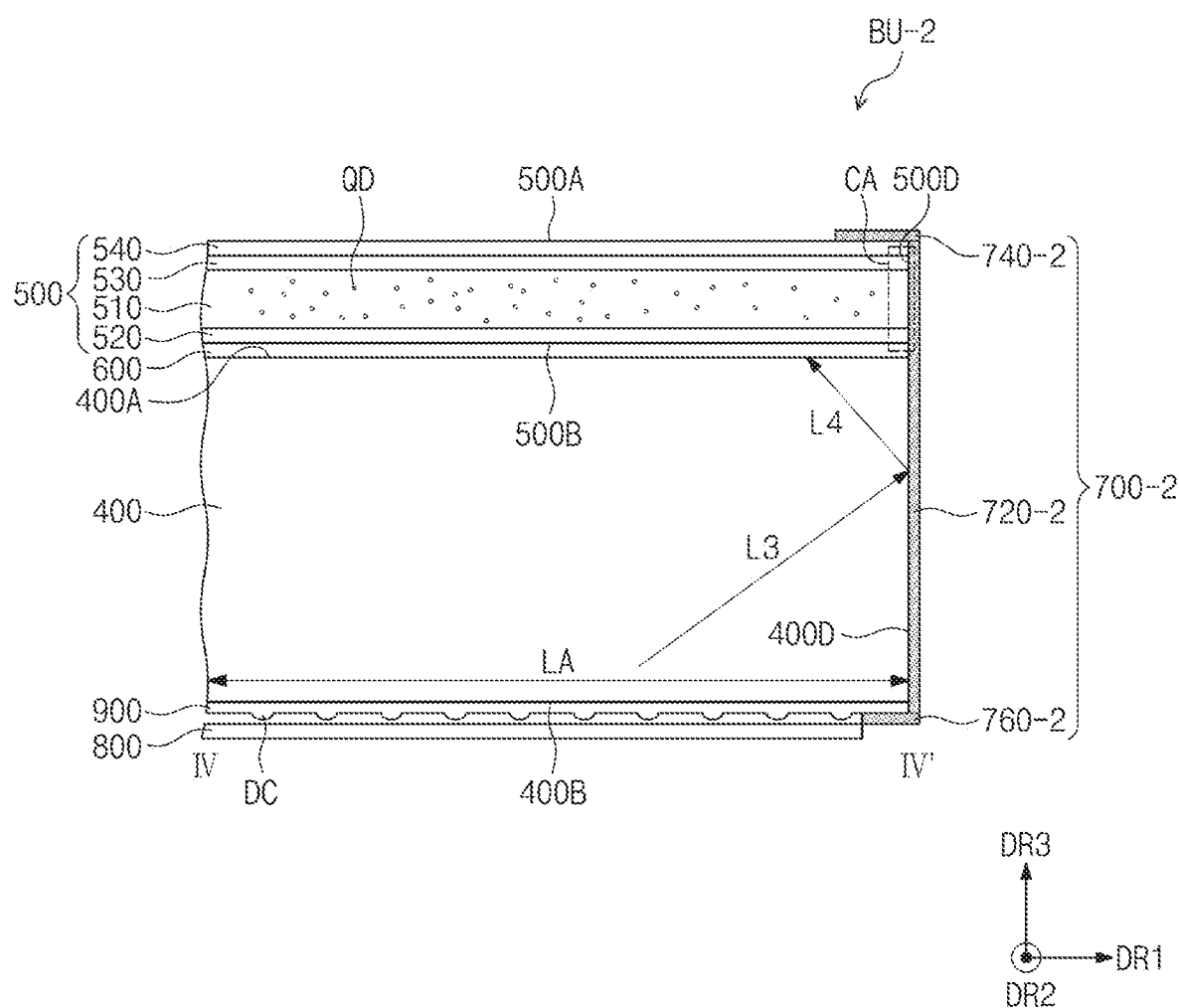

Referring to FIGS. 5A to 5C, an adhesive member 700-2 may further cover at least a portion of the second area LB, as compared with the embodiments of FIGS. 1, 3A, 3B, 4A and 4B. In addition, the adhesive member 700-2 may further cover the opposite surface 400D and a portion of the diffusion pattern part 900. In detail, the adhesive member 700-2 may include a first sub-adhesive member 710-2, a second sub-adhesive member 720-2, a third sub-adhesive member 730-2, a fourth sub-adhesive member 740-2, a fifth sub-adhesive member 750-2, and a sixth sub-adhesive member 760-2.

The first sub-adhesive member 710-2 may substantially correspond to the first sub-adhesive member 710 illustrated in FIG. 3A, and the third and fourth sub-adhesive members 730-2 and 740-2 may substantially correspond to the third and fourth sub-adhesive members 730-1 and 740-1 illustrated in FIGS. 4A and 4B.

The second sub-adhesive member 720-2 according to the exemplary embodiment may cover and be adhered to the second connection surface 500D and the opposite surface 400D when viewed in a cross-sectional view. In an embodiment, the second sub-adhesive member 720-2 may substantially cover the other connection surfaces 500D, 500E and 500F of the optical member 500 except the first connection surface 500C and the other side surfaces 400D, 400E and 400F of the light guide plate 400 except the light incident surface 400C.

The fifth sub-adhesive member 750-2 may cover at least a portion of the second area LB. The fifth sub-adhesive member 750-2 may be connected to the first sub-adhesive member 710-2 as a single unitary body or may be provided as an independent component detachable from the first sub-adhesive member 710-2.

The sixth sub-adhesive member 760-2 may surround other side surfaces of the diffusion pattern part 900 except a side surface facing the light incident surface 400C and at least a portion of a surface, opposite to the light guide plate 400, of the diffusion pattern part 900. The sixth sub-adhesive member 760-2 may be connected to the second sub-adhesive member 720-2 as a single unitary body or may be provided as an independent component detachable from the second sub-adhesive member 720-2.

First light L1 corresponding to a portion of light provided from the light source unit 300 may be incident on the second area LB. In FIG. 4A, the second area LB may be exposed by the adhesive member 700-1 to form a boundary with air. Light incident to the second area LB at an angle less than a critical angle for total reflection may be transmitted from the second area LB to the outside.

However, the fifth sub-adhesive member 750-2 of the adhesive member 700-2 according to the exemplary embodiment may cover and be adhered to at least a portion of the second area LB to prevent light from being transmitted to the outside. When the second area LB is covered by the adhesive member 700-2 including a reflective material, the first light L1 incident to the second area LB may be reflected by the adhesive member 700-2 to travel into the light guide plate 400 (see second light L2 of FIG. 5B). Thus, a loss of light transmitted from the second area LB to the outside may be reduced, and brightness of the light guide plate 400 may become substantially uniform to reduce or prevent a hot spot phenomenon. In addition, since the adhesive member 700-2 covers the other side surfaces 400D, 400E and 400F of the light guide plate 400 except the light incident surface 400C, the adhesive member 700-2 may reflect light incident to the other side surfaces 400D, 400E and 400F to increase the amount of light incident to the display panel 100. For example, third light L3 incident to the opposite surface 400D may be reflected by the adhesive member 700-2 to increase the amount of fourth light L4 toward the display panel 100, as illustrated in FIG. 5C. Thus, light efficiency of the display device 1000 may be improved and brightness of the display device 1000 may be substantially uniform.

A portion of the adhesive member 700-2 according to the exemplary embodiment may cover a portion of the diffusion pattern part 900, and thus other components of a backlight unit BU-2 except the light source unit 300 and the reflective sheet 800 may be adhered to the adhesive member 700-2. As a result, occurrence of a defect such as interlayer delamination may be prevented and the display device 1000 with improved mechanical strength may be provided.

Figure 5D:
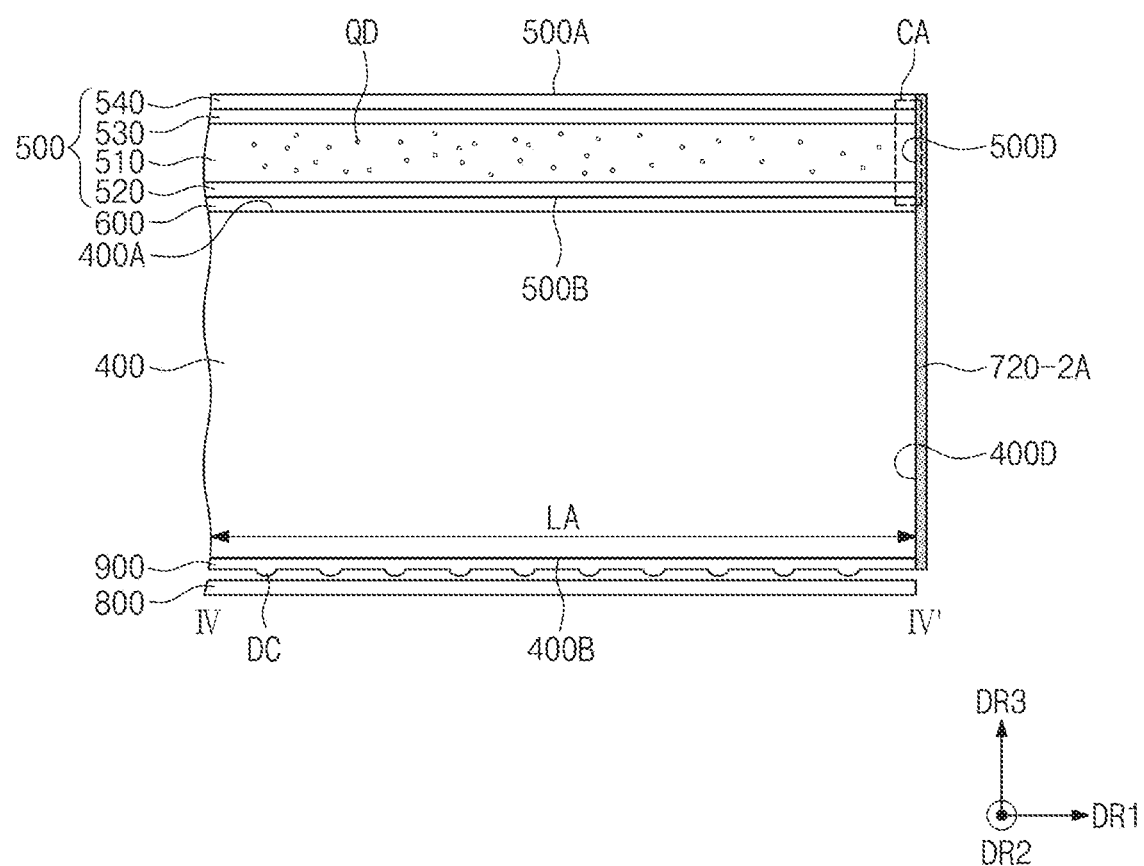

On the other hand, as illustrated in FIG. 5D, a second sub-adhesive member 720-2A may expose the top surface of the organic layer 540 and the bottom surface of the diffusion pattern part 900. For example, the fourth and sixth sub-adhesive members 740-2 and 760-2 may be removed or omitted from the second sub-adhesive member 720-2A, as compared with the second sub-adhesive member 720-2 of FIG. 5C. The second sub-adhesive member 720-2A may cover and be adhered to the second connection surface 500D of the optical member 500 and the opposite surface 400D of the light guide plate 400. Thus, the top surface 500A of the optical member 500 and the bottom surface of the diffusion pattern part 900 may be exposed by the second sub-adhesive member 720-2A, as compared with FIG. 5C. Even though not shown in the drawings, in an embodiment, the third sub-adhesive member 730-2 of FIG. 5B may be omitted to expose the top surface 500A of the optical member 500.

Figure 5E:
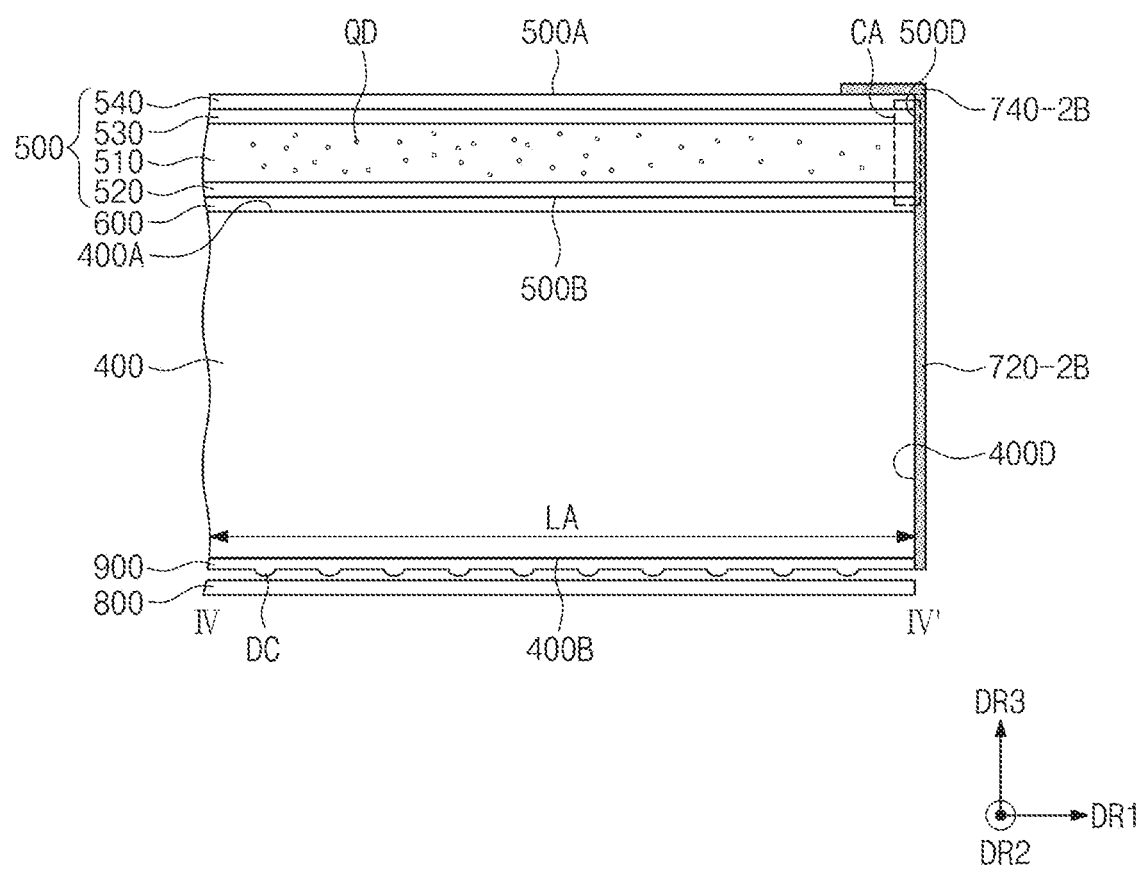

Alternatively, as illustrated in FIG. 5E, an adhesive member may cover a portion of the top surface of the organic layer 540 and may expose the bottom surface of the diffusion pattern part 900. For example, the sixth sub-adhesive member 760-2 may be omitted from a second sub-adhesive member 720-2B, as compared with the second sub-adhesive member 720-2 of FIG. 5C. The second sub-adhesive member 720-2B may cover and be adhered to the second connection surface 500D of the optical member 500 and the opposite surface 400D of the light guide plate 400. A fourth sub-adhesive member 740-2B may cover the top surface 500A of the optical member 500. The fourth sub-adhesive member 740-2B of the exemplary embodiment may be substantially the same as the fourth sub-adhesive member 740-2 illustrated in FIG. 5C. In the exemplary embodiment, the bottom surface of the diffusion pattern part 900 may be exposed by the second sub-adhesive member 720-2B.

According to some exemplary embodiments, the shape of the adhesive member 700-2 may be variously modified under the condition that it covers the exposed surfaces of the light conversion layer 510, and exemplary embodiments are not limited to a specific shape.

Figure 6A:
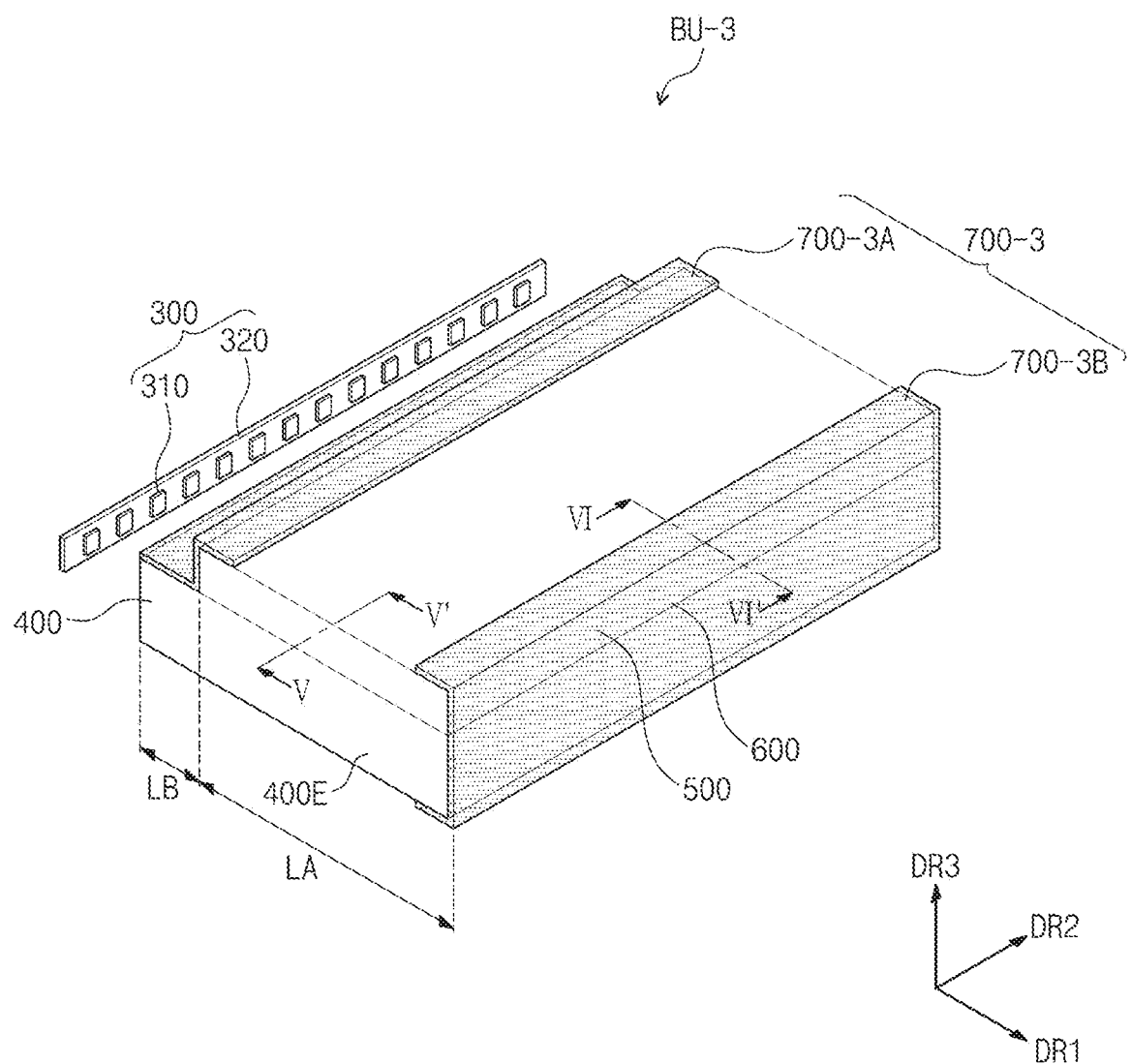
FIG. 6A is a perspective view of still another exemplary embodiment illustrating some components of a backlight unit constructed according to principles of the invention.
Figure 6B:
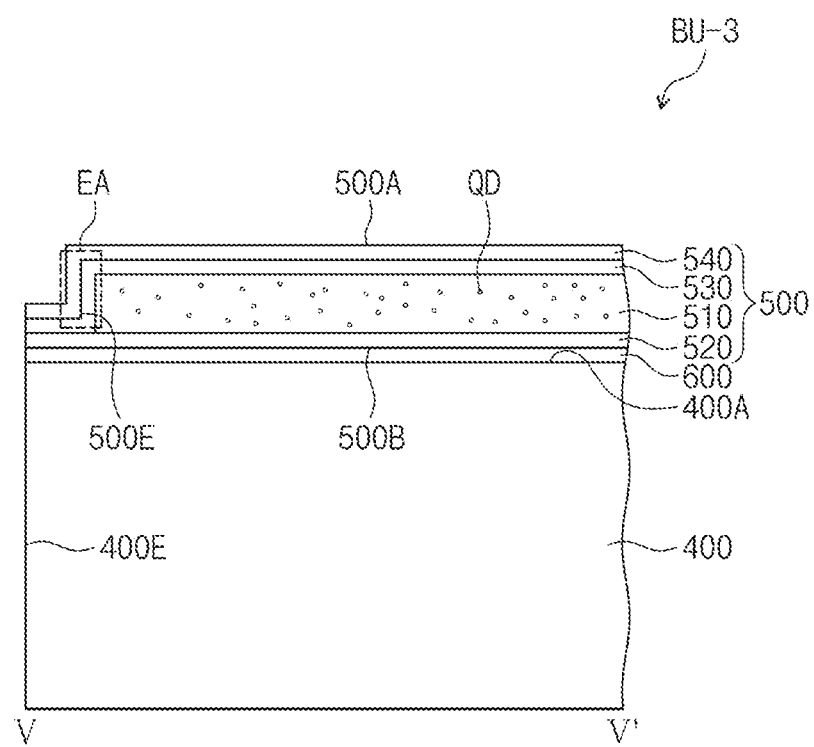
FIG. 6B is a cross-sectional view taken along a line V-V' of FIG. 6A.
Figure 6B:
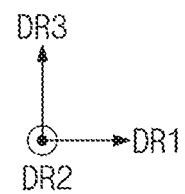
Figure 6C:
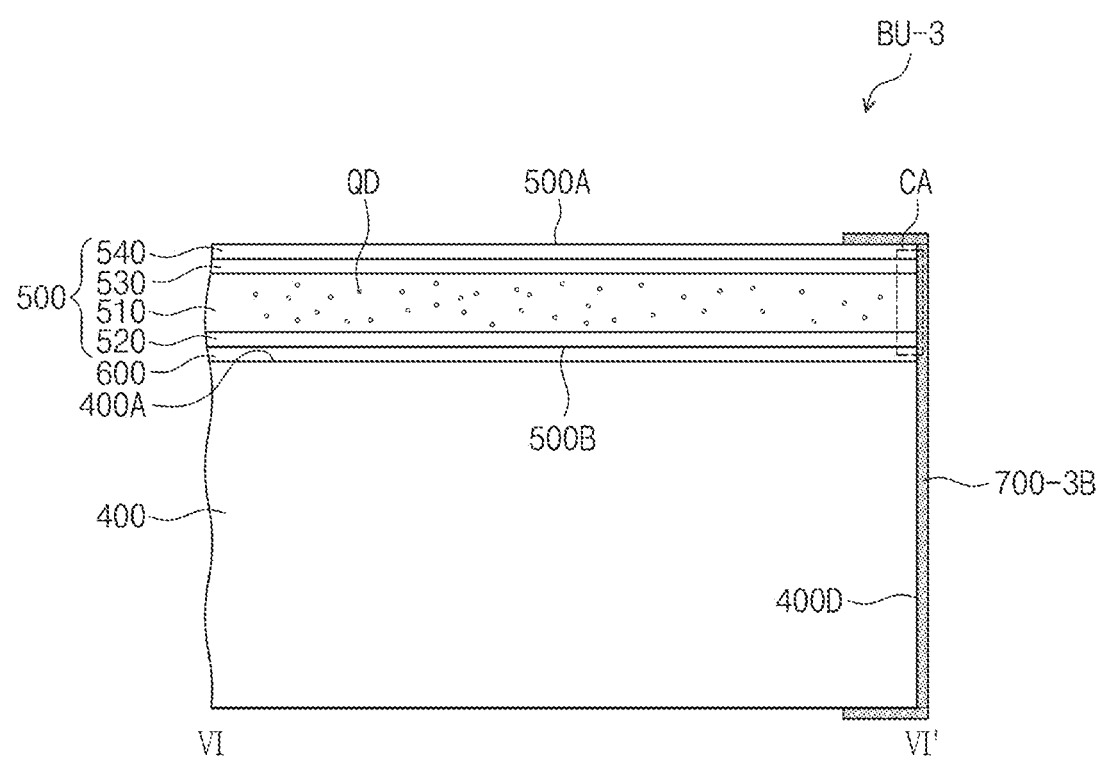
FIG. 6C is a cross-sectional view taken along a line VI-VI' of FIG. 6A.

FIG. 6A is a perspective view of still another exemplary embodiment illustrating some components of a backlight unit constructed according to principles of the invention. FIG. 6B is a cross-sectional view taken along a line V-V' of FIG. 6A. FIG. 6C is a cross-sectional view taken along a line VI-VI' of FIG. 6A. Hereinafter, the same components as described with reference to FIGS. 1 to 4B will be indicated by the same reference numerals or designators, and the descriptions thereto will be omitted for the purpose of ease and convenience in description.

The adhesive members illustrated in FIGS. 1 to 5B may surround and be adhered to the light guide plate 400 and the optical member 500 in a plan view. However, an adhesive member 700-3 illustrated in FIG. 6A may be adhered to the light guide plate 400 and the optical member 500 to expose at least one of side surfaces of each of the light guide plate 400 and the optical member 500. For example, the exposed side surfaces of the light guide plate 400 may correspond to the third side surface 400E and the fourth side surface 400F, and the exposed side surfaces of the optical member 500 may correspond to the third connection surface 500E and the fourth connection surface 500F. The adhesive member 700-3 according to the exemplary embodiment may include a first adhesive member 700-3A and a second adhesive member 700-3B. The first adhesive member 700-3A and the second adhesive member 700-3B may be spaced apart from each other.

As illustrated in FIGS. 6A and 6B, some (e.g., side surfaces defining the third and fourth connection surfaces 500E and 500F) of side surfaces of the light conversion layer 510 may be exposed by the adhesive member 700-3 but may be covered by the second inorganic layer 530 (see an area EA). The second inorganic layer 530 may cover a top surface of the light conversion layer 510 and may extend along the some side surfaces of the light conversion layer 510 so as to be in contact with the first inorganic layer 520. Thus, the side surface of the light conversion layer 510, which defines the third connection surface 500E of the optical member 500, may be stably encapsulated by the second inorganic layer 530 and the first inorganic layer 520 without an additional adhesive member.

According to the exemplary embodiment, the third and fourth connection surfaces 500E and 500F of the optical member 500 may be exposed from the adhesive member 700-3. As illustrated in FIG. 6B, the third connection surface 500E exposed from the adhesive member 700-3 may be covered by the second inorganic layer 530. Thus, it is possible to prevent a dark portion which may occur by permeation of moisture and/or oxygen to the light conversion layer 510.

Figure 7A:
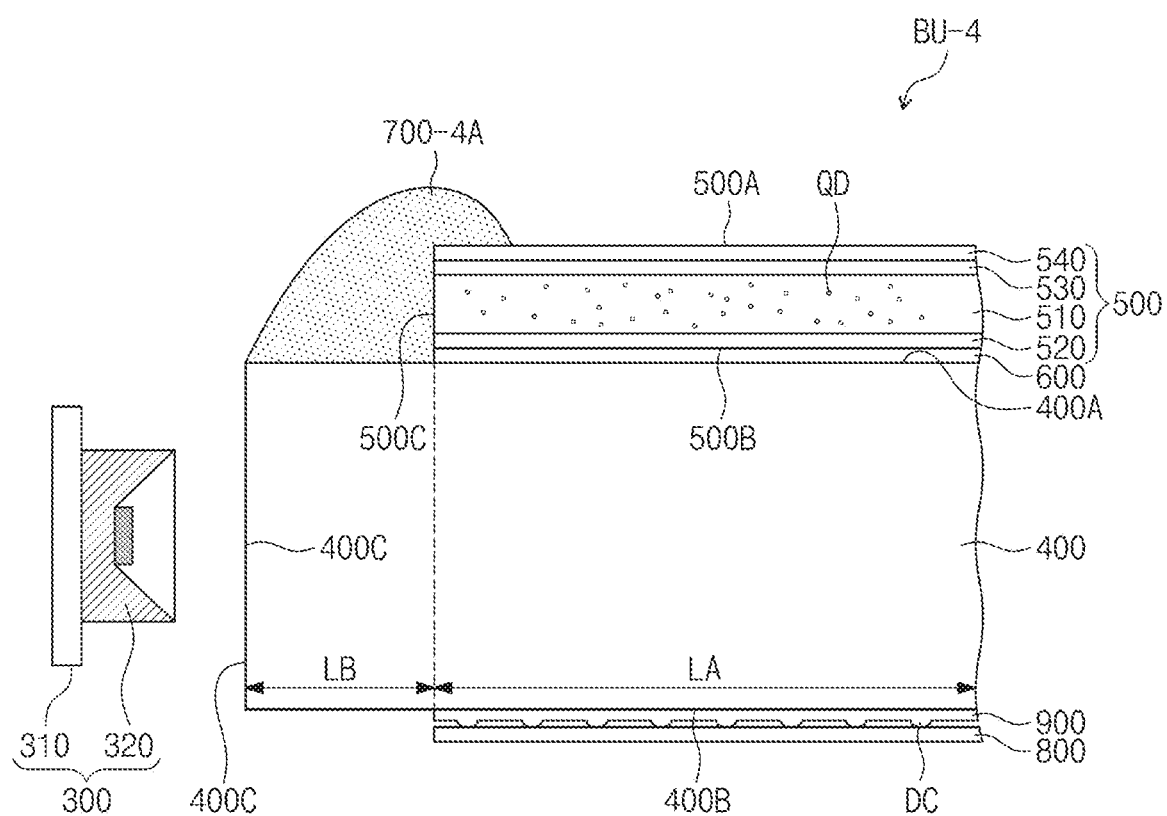
FIGS. 7A and 7B are cross-sectional views of a backlight unit according to another exemplary embodiment of the invention.
Figure 7B:
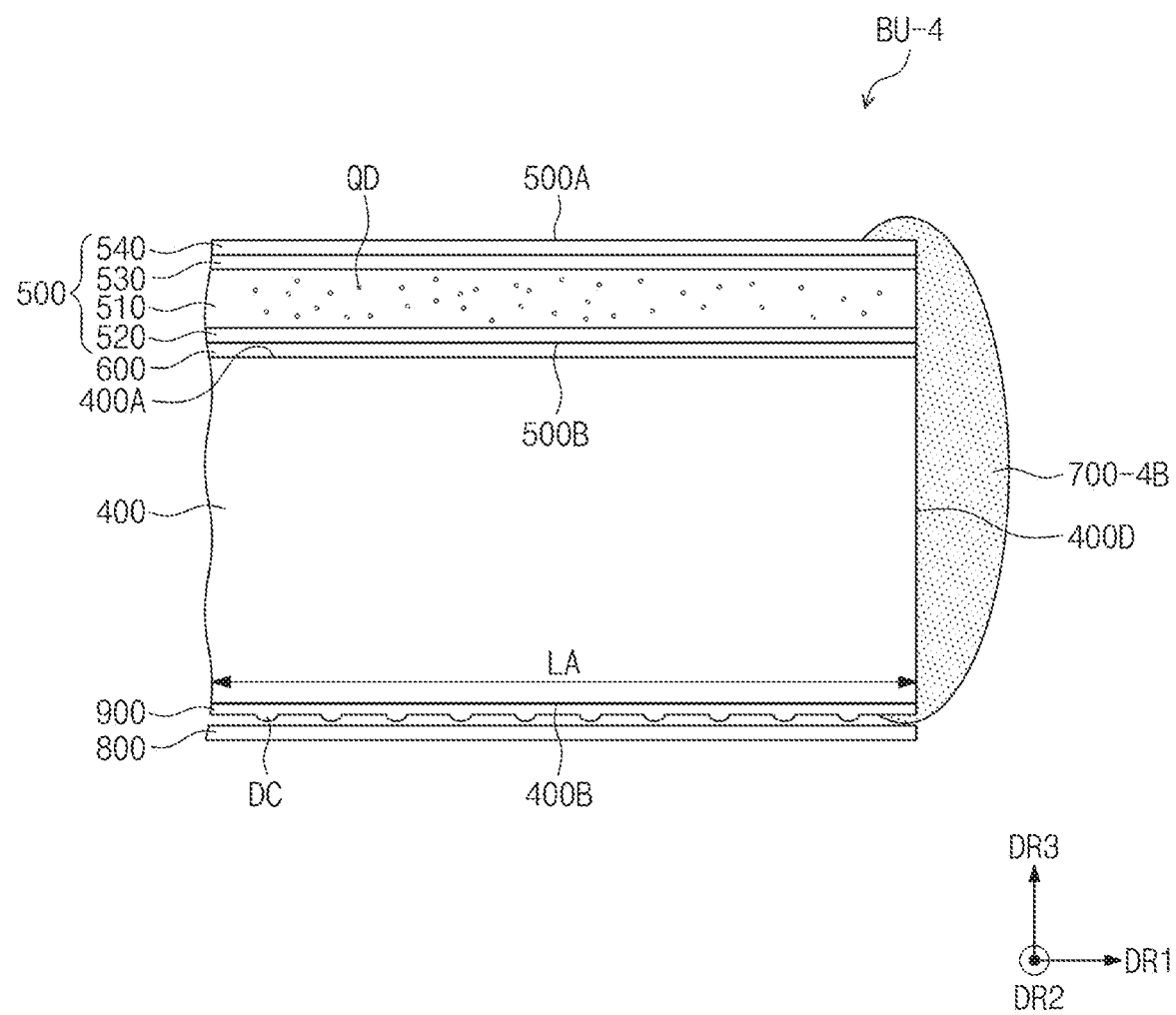

FIGS. 7A and 7B are cross-sectional views of a backlight unit according to another exemplary embodiment of the invention. FIG. 7A illustrates an area corresponding to that of FIG. 3A, and FIG. 7B illustrates an area corresponding to that of FIG. 3B. Hereinafter, the same components as described with reference to FIGS. 1 to 4B will be indicated by the same reference numerals or designators, and the descriptions thereto will be omitted for the purpose of ease and convenience in description.

An adhesive member 700-4A and 700-4B illustrated in FIGS. 7A and 7B may be provided in the form of paste including a reflective material. The adhesive member 700-4A and 700-4B of FIGS. 7A and 7B may surround and cover the connection surfaces 500C, 500D, 500E and 500F of the optical member 500 like the adhesive members of FIGS. 1 and 5A or may be disposed to expose some side surfaces of the light guide plate 400 and the optical member 500 like the adhesive member 700-3 illustrated in FIG. 6A.

Figure 8A:
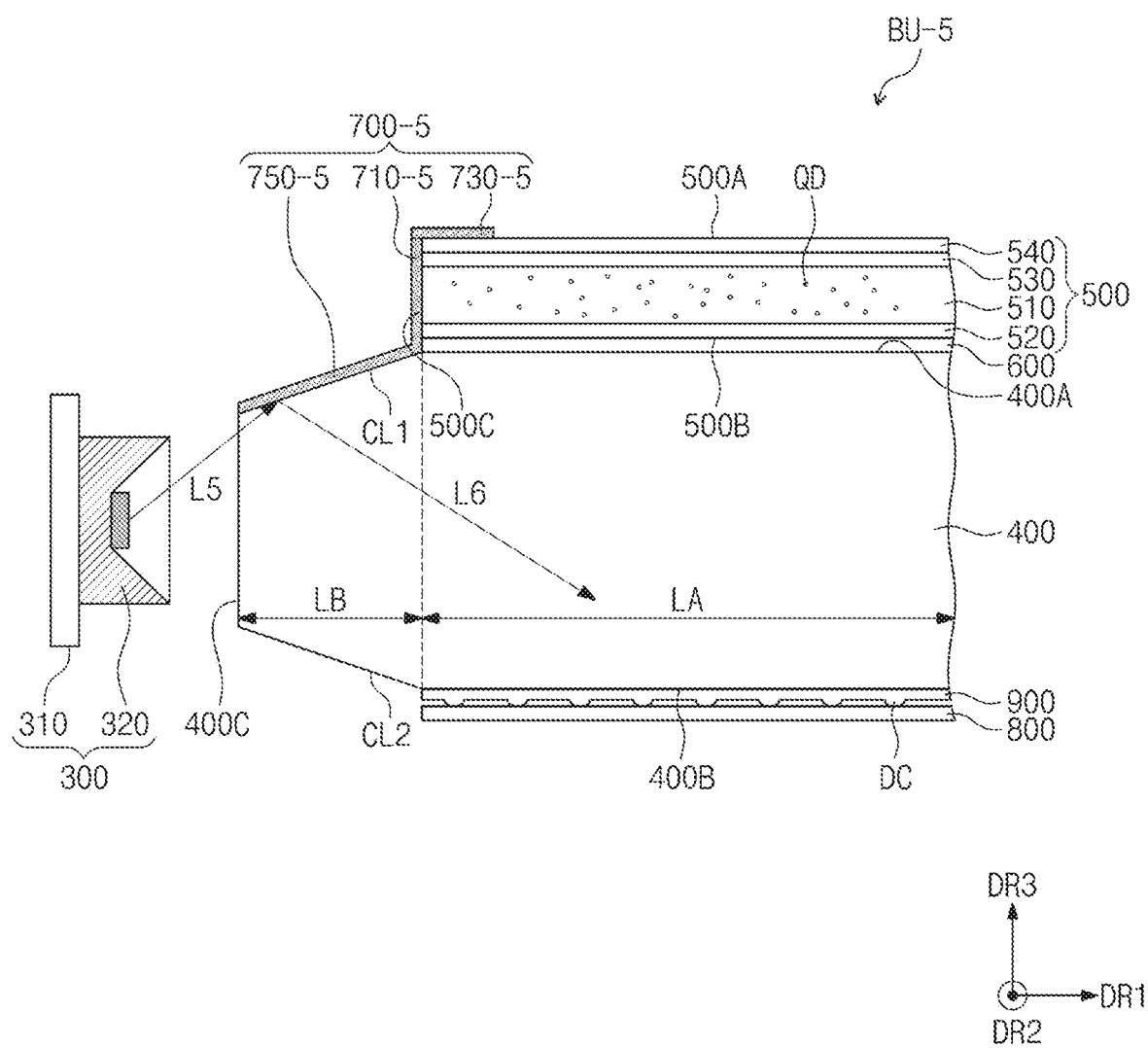
FIGS. 8A and 8B are cross-sectional views of a backlight unit according to an yet another exemplary embodiment of the invention.
Figure 8B:
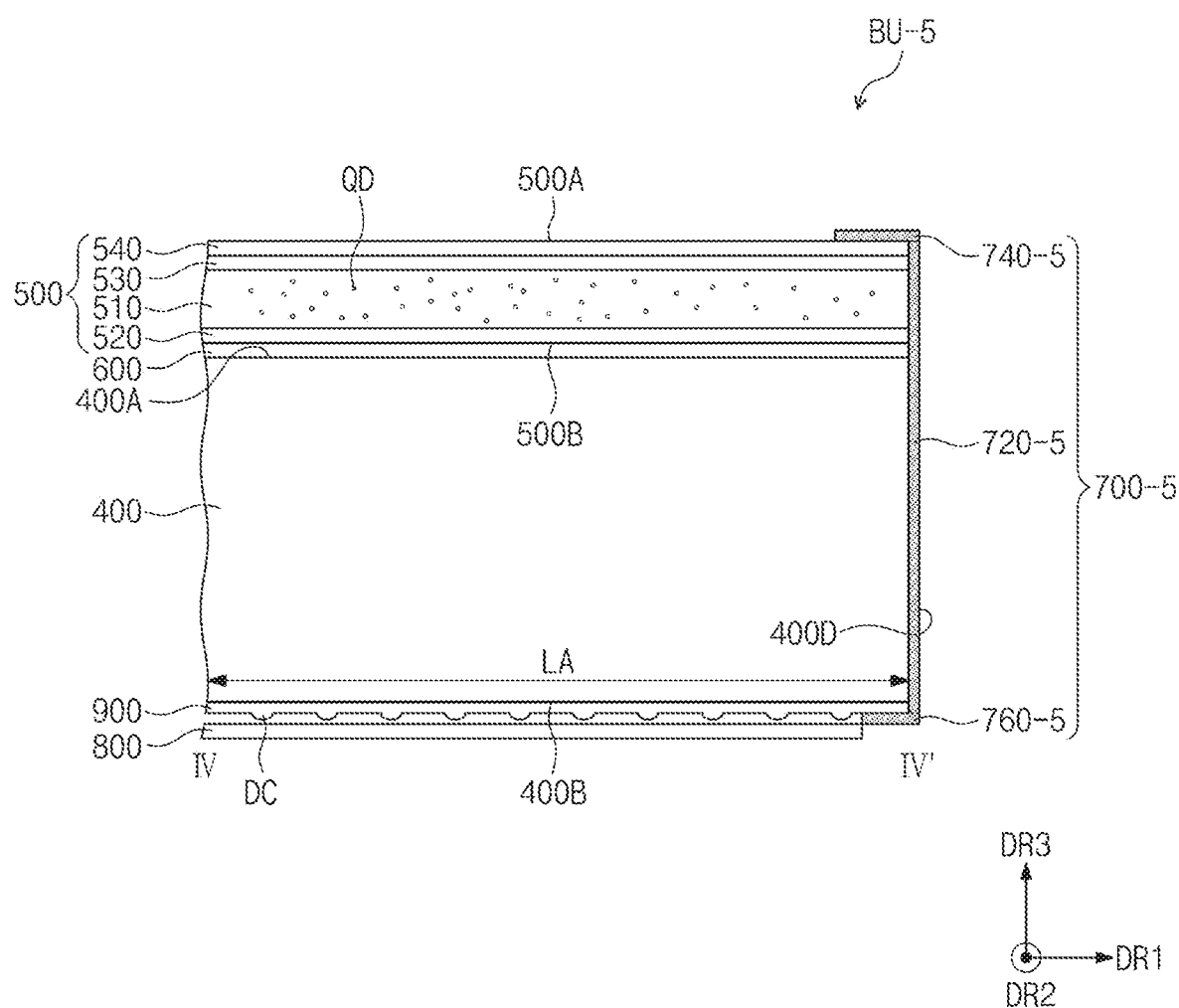

FIGS. 8A and 8B are cross-sectional views illustrating a backlight unit according to an yet another exemplary embodiment of the invention. FIG. 8A illustrates an area corresponding to that of FIG. 3A, and FIG. 8B illustrates an area corresponding to that of FIG. 3B. Hereinafter, the same components as described with reference to FIGS. 1 to 4B will be indicated by the same reference numerals or designators, and the descriptions thereto will be omitted for the purpose of ease and convenience in description.

Referring to FIG. 8A, the light exit surface 400A and the bottom surface 400B of the light guide plate 400 according to an embodiment may include a first inclined surface CL1 and a second inclined surface CL2, respectively. Each of the first and second inclined surfaces CL1 and CL2 may be inclined at a predetermined angle from the first side surface 400C. The first inclined surface CL1 may overlap with the second area LB when viewed in a plan view. According to an exemplary embodiment, the first connection surface 500C of the optical member 500 may be covered by a first sub-adhesive member 710-5, and a portion of the top surface 500A of the optical member 500 may be covered by a third sub-adhesive member 730-5. In addition, a fifth sub-adhesive member 750-5 may cover and be adhered to the first inclined surface CL1. Thus, fifth light L5 incident to the first inclined surface CL1 may be reflected by the adhesive member 700-5 including a reflective material and covering the first inclined surface CL1, and the reflected light L6 may be provided into the light guide plate 400.

As illustrated in FIG. 8B, a second sub-adhesive member 720-5 may cover the second connection surface 500D and the opposite surface 400D. A fourth sub-adhesive member 740-5 may cover a portion of the top surface 500A, and a sixth sub-adhesive member 760-5 may cover a portion of the diffusion pattern part 900. However, exemplary embodiments are not limited thereto. In other embodiments, the adhesive member 700-5 may have the same shape as the adhesive member 700 of FIG. 3B, the adhesive member 700-1 of FIG. 4B, or the adhesive member 700-2 of FIG. 5C.

According to the exemplary embodiment, the inclined surfaces CL1 and CL2 may be disposed at a portion of the light guide plate 400, which is adjacent to the light incident surface 400C. Thus, an incidence angle of light incident from the inclined surfaces CL1 and CL2 into the light guide plate 400 may be increased to increase the amount of light totally reflected into the light guide plate 400. Thus, the light efficiency of the display device may be improved, and the display device may have substantially uniform brightness.

According to the exemplary embodiments, the adhesive members having a reflection function may be adhered to some components of the backlight unit, and thus light may be totally reflected at the top surface of the light guide plate adjacent to the light incident surface. As a result, the light efficiency of the display device may be improved and durability of the display device may also be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel to display an image;
   a light source unit adjacent to the display panel to provide light thereto;
   a light guide plate including: a light exit surface facing the display panel; a bottom surface opposite to the light exit surface; a light incident surface facing the light source unit and connecting the bottom surface and the light exit surface; an opposite surface opposite to the light incident surface; and a first side surface and a second side surface which connect the light incident surface and the opposite surface and are opposite to each other;
   a first refractive layer disposed on the light exit surface and having a refractive index lower than that of the light guide plate;
   an optical member disposed between the display panel and the light guide plate and including: a top surface facing the display panel; a bottom surface opposite to the top surface; a first connection surface connecting the top surface and the bottom surface and disposed at the same side as the light incident surface; a second connection surface opposite to the first connection surface; and a third connection surface and a fourth connection surface which connect the first and second connection surfaces and are opposite to each other;
   a first protective member covering at least a portion of at least one of the light exit surface of the light guide plate and the first connection surface of the optical member; and
   a second protective member covering at least one of the opposite surface and/the second connection surface.

2. The display device of claim 1, wherein the optical member comprises a first inorganic layer disposed on the first refractive layer and having a refractive index higher than that of the first refractive layer; a second inorganic layer having a refractive index lower than that of the first inorganic layer; a light conversion layer disposed between the first inorganic layer and the second inorganic layer; and an organic layer disposed on the second inorganic layer, and
   wherein the light conversion layer is exposed by the second inorganic layer and is in contact with the first protective member and the second protective member.

3. The display device of claim 2, wherein each of the first and second protective members further comprises a sub-protective member covering at least a portion of a top surface of the second inorganic layer.

4. The display device of claim 3, wherein the first and second protective members expose some of side surfaces of the light conversion layer, and at least one of the second inorganic layer and/or the organic layer covers the some side surfaces of the light conversion layer, which are exposed by the first and second protective members.

5. The display device of claim 2, wherein the light conversion layer comprises quantum dots.

6. The display device of claim 1, wherein the first and second protective members include at least one of silver (Ag), aluminum (Al), or titanium dioxide ($TiO_2$).

7. The display device of claim 1, wherein the first and second protective members comprise adhesive members selected from the group consisting of adhesive layers, pastes and tapes.

8. The display device of claim 1, wherein the light is blue light.

9. The display device of claim 1, further comprising:
   a member having a diffusion pattern disposed on the bottom surface of the light guide plate; and
   a reflective sheet disposed under the diffusion pattern,
   wherein the second protective member further covers a portion of the diffusion pattern part.

10. The display device of claim 1, further comprising:
    an optical sheet member disposed between the display panel and the optical member and comprising at least one of a diffusion sheet, a prism sheet disposed on the diffusion sheet, or a brightness enhancement sheet disposed on the prism sheet.

11. The display device of claim 1, further comprising:
    third and fourth protective members respectively covering the third and fourth connection surfaces exposed by the first and second protective members.

12. The display device of claim 1, wherein the light exit surface further comprises: a first inclined surface inclined from the light incident surface at a predetermined angle and connected to the light incident surface, and the bottom surface of the light guide plate further comprises: a second inclined surface inclined from the light incident surface at a predetermined angle and connected to the light incident surface, wherein the first inclined surface is covered by the first protective member.

13. A backlight unit comprising:
a light source unit to provide light;
a light guide plate including: a light exit surface from which the light exits; a bottom surface opposite to the light exit surface; a light incident surface facing the light source unit and connecting the bottom surface and the light exit surface; an opposite surface opposite to the light incident surface; and a first side surface and a second side surface which connect the light incident surface and the opposite surface and are opposite to each other;
a first refractive layer disposed on the light exit surface and having a refractive index lower than that of the light guide plate;
an optical member including: a light conversion layer having quantum dots; a first inorganic layer disposed on a bottom surface of the light conversion layer; and a second inorganic layer disposed on a top surface of the light conversion layer and exposing at least one side surface of the light conversion layer; and
a protective member covering and being in contact with the exposed at least one side surface of the light conversion layer.

14. The backlight unit of claim 13, wherein the optical member further comprises an organic layer disposed on the second inorganic layer, and
wherein the optical member includes: a top surface which is substantially the same as a top of the organic layer; a bottom surface which is opposite to the top surface and is substantially the same as a bottom of the first inorganic layer; and a plurality of connection surfaces connecting the top surface and the bottom surface, and
wherein at least one of the connection surfaces, which is exposed from the first and second inorganic layers, is covered by the protective member and is in direct contact with the protective member.

15. The backlight unit of claim 14, wherein the protective member further comprises a sub-protective member covering at least a portion of a top surface of the organic layer.

16. The backlight unit of claim 14, wherein one of the connection surfaces covered by the protective member of the optical member is adjacent to the opposite surface and is substantially coplanar with the opposite surface.

17. The backlight unit of claim 13, wherein the protective member further comprises a sub-protective member covering the opposite surface.

18. The backlight unit of claim 13, wherein the light exit surface further comprises a first inclined surface having a predetermined angle from the light incident surface and connected to the light incident surface, and the bottom surface of the light guide plate further comprises: a second inclined surface having a predetermined angle from the light incident surface and connected to the light incident surface,
wherein at least a portion of the first inclined surface is covered by the protective member.

19. The backlight unit of claim 13, wherein the protective member includes at least one of silver (Ag), aluminum (Al), or titanium dioxide (TiO$_2$).

20. The backlight unit of claim 13, wherein the light is blue light.

* * * * *